United States Patent
Oda et al.

(10) Patent No.: US 7,258,961 B2
(45) Date of Patent: Aug. 21, 2007

(54) PLANORGRAPHIC PRINTING PLATE PRECURSOR

(75) Inventors: Akio Oda, Shizuoka-ken (JP); Hideo Miyake, Shizuoka-ken (JP); Tomoyoshi Mitsumoto, Shizuoka-ken (JP); Takeshi Serikawa, Shizuoka-ken (JP); Ikuo Kawauchi, Shizuoka-ken (JP); Ippei Nakamura, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/642,528

(22) Filed: Dec. 21, 2006

(65) Prior Publication Data

US 2007/0099118 A1 May 3, 2007

Related U.S. Application Data

(62) Division of application No. 10/179,390, filed on Jun. 26, 2002.

(30) Foreign Application Priority Data

| Jun. 27, 2001 | (JP) | ............................. | 2001-194327 |
| Jun. 29, 2001 | (JP) | ............................. | 2001-198682 |
| Jul. 17, 2001 | (JP) | ............................. | 2001-216760 |

(51) Int. Cl.
*G03F 7/004* (2006.01)

(52) U.S. Cl. ...................... 430/156; 430/159; 430/162; 430/302

(58) Field of Classification Search ................ 430/156, 430/159, 162, 302
See application file for complete search history.

(56) References Cited

U.S. PATENT DOCUMENTS

| 6,083,663 A | 7/2000 | Vermeersch et al. |
| 6,153,353 A | 11/2000 | Van Damme et al. |
| 6,340,551 B1 | 1/2002 | Miyake et al. |
| 6,423,462 B1 | 7/2002 | Kunita |
| 2002/0136979 A1 | 9/2002 | Miyake et al. |

FOREIGN PATENT DOCUMENTS

| EP | 0913253 A1 | 5/1999 |
| EP | 0943451 A1 | 9/1999 |
| EP | 1093934 A1 | 4/2001 |
| EP | 1129861 A1 | 9/2001 |
| EP | 1211065 A2 | 6/2002 |
| WO | WO98/51496 A1 | 11/1998 |
| WO | WO99/67097 A2 | 12/1999 |
| WO | WO 01/46318 A1 | 6/2001 |

*Primary Examiner*—John S. Chu
(74) *Attorney, Agent, or Firm*—Sughrue Mion, PLLC

(57) ABSTRACT

A positive planographic printing plate precursor includes a support having disposed thereon a lower thermosensitive layer containing a water-insoluble but alkali-soluble polymer compound and an upper thermosensitive layer containing a water-insoluble but alkali-soluble polymer compound, with alkali-solubility increasing under heat, wherein (i) both the upper thermosensitive layer and the lower thermosensitive layer contain an IR absorbing dye, with the ratio of the IR absorbing dye concentration in the upper thermosensitive layer to the IR absorbing dye concentration in the lower thermosensitive layer is 1.6 to 10.0, and/or (ii) the upper thermosensitive layer and the lower thermosensitive layer contain different IR absorbing dyes, and/or (iii) at least one of the upper thermosensitive layer and the lower thermosensitive layer contains an IR absorbent having, in one molecule, at least two chromophoric groups that absorb IR light, with the chromophoric groups bonding to each other via a covalent bond.

15 Claims, No Drawings

PLANORGRAPHIC PRINTING PLATE PRECURSOR

This is a divisional of application Ser. No. 10/179,390 filed Jun. 26, 2002. The entire disclosure of the prior application, application Ser. No. 10/179,390 is hereby incorporated by reference.

BACKGROUND OF THE INVENTION

1. Field of the Invention

The present invention relates to a planographic printing plate precursor, and more particularly to a positive planographic printing plate precursor having a recording layer that is rendered alkali-soluble by exposure to an infrared laser.

2. Description of the Related Art

The development of lasers in recent years has been remarkable. In particular, high-output, compact solid-state lasers and semiconductor lasers having an emission range in the near infrared to infrared range are being developed. These lasers are extremely useful as exposure light sources when a printing plate is formed directly on the basis of digital data from a computer or the like.

Positive planographic printing plate precursors for exposure to IR lasers include as essential components a binder resin that is soluble in an aqueous alkali solution, and an infrared (IR) dye that absorbs light to generate heat. In the non-exposed area (image area) of the precursor, the IR dye acts as a dissolution inhibitor that interacts with the binder resin to substantially lower the solubility of the binder resin. In the exposed area (non-image area) of the precursor, however, the interaction of the IR dye with the binder resin is weakened by the heat generated and the binder resin dissolves in alkali developer, whereby the precursor is processed into a planographic printing plate.

However, the difference in various processing conditions between resistance to dissolution of the non-exposed area (image area) in a developer and solubility of the exposed area (non-image area) is still insufficient, and there are problems in that varying processing conditions tends to produce overdevelopment or insufficient development. In addition, it is easy for the surface of the precursor to be compromised by, for example, fine scratches formed in the surface of the precursor when the precursor is handled. When such fine scratches are formed in the surface of the precursor and the surface of the precursor is slightly compromised, the surface solubility of the precursor increases, and when developed, the non-exposed area (image area) of the precursor dissolves to form scratch marks. This lowers printing durability and interferes with ink adhesion to the printing plate.

These problems stem from a fundamental difference in the plate-making mechanism between positive planographic printing plate precursors for IR lasers and positive planographic printing plate precursors, which are processed into printing plates by being exposed to UV light. Specifically, positive planographic printing plate precursors processed into printing plates by being exposed to UV light include as essential components a binder resin soluble in an aqueous alkali solution and an onium salt or quinonediazide compound. The onium salt or the quinonediazide compound not only interacts with the binder resin to lower the solubility of the binder resin at the non-exposed area (image area), but also promotes dissolution by being decomposed by light to generate an acid at the exposed area (non-image area). The onium salt or the quinonediazide compound thus plays two roles.

In contrast, in positive planographic printing plate precursors for IR lasers, IR dyes act only as dissolution inhibitors at the non-exposed area (image area), and do not promote the dissolution of the binder resin at the exposed area (non-image area). In order to produce a difference in solubility between the non-exposed area and the exposed area, a binder resin having a high solubility in alkali developer must be used in the precursor, and this leads to the problems of poor scratch resistance and unstable conditions before development of the precursor.

As means to overcome these problems, Japanese Patent Application Laid-open Publication (JP-A) No. 10-250255 proposes multiple thermosensitive layers. However, these layers do not substantially utilize changes in solubility in the key process of image formation, but utilize a function in which ablation of an upper layer alters the penetrability of the developer into the layers. Therefore, various problems arise, such as a drop in laser output due to contamination of the optical system resulting from ablation, and contamination of the interior of the device.

JP-A No. 2000-35662 discloses multiple thermosensitive layers including an upper layer and a lower layer, with each of the upper and lower layers containing a light-heat converting material. When carbon black is used as the light-heat converting material as in the embodiments described in the application, problems due to ablation easily arise when sensitivity is raised by increasing the amount of carbon black in the uppermost layer. On the other hand, when the amount of carbon black in the uppermost layer is lowered to prevent ablation, there are problems in that sensitivity is significantly reduced. Thus, it has been difficult to overcome the preceding problems simply by adding a light-heat converting agent to the two layers.

SUMMARY OF THE INVENTION

The present invention was devised in consideration of the problems noted above. It is an object of the invention to provide a planographic printing plate precursor that includes a positive thermosensitive recording layer on which recording can be effected at a high sensitivity and in which scattering of the recording layer due to ablation is suppressed.

As a result of assiduous research to attain this object, the present inventors found that the problems noted above are solved by a precursor disposed with at least two (i.e., lower and upper) thermosensitive layers, by adding a specific amount of a specific light-heat converting agent to the multiple thermosensitive layers, by adding respectively different IR absorbing dyes to the upper and lower thermosensitive layers, and/or by using a specific IR absorbent.

Specifically, the invention provides positive planographic printing plate precursor comprising a support having successively disposed thereon a lower thermosensitive layer containing a water-insoluble but alkali-soluble polymer compound, and an upper thermosensitive layer containing a water-insoluble but alkali-soluble polymer compound, with solubility in an aqueous alkali solution increasing under heat, wherein at least one of the following conditions (i) to (iii) is satisfied:

(i) both the upper thermosensitive layer and the lower thermosensitive layer contain an IR absorbing dye, with the ratio of the IR absorbing dye concentration in the upper thermosensitive layer to the IR absorbing dye concentration in the lower thermosensitive layer is 1.6 to 10.0;

(ii) the upper thermosensitive layer and the lower thermosensitive layer contain different IR absorbing dyes;

(iii) at least one of the upper thermosensitive layer and the lower thermosensitive layer contains an IR absorbent having, in one molecule, at least two chromophoric groups that absorb IR light, with the chromophoric groups in the IR absorbent bonding to each other via a covalent bond.

In one embodiment of the invention, the positive planographic printing plate precursor satisfies at least the condition (i) and in which the coating amount of the upper thermosensitive layer is at most 0.4 g/m².

In another embodiment of the invention, the positive planographic printing plate precursor satisfies at least the condition (ii), and in which the amount of the IR absorbing dye added to the upper thermosensitive layer is 3 to 50% by weight of the overall weight of the layer, and the amount of the IR absorbing dye added to the lower thermosensitive layer is 0.1 to 10% by weight of the overall weight of the layer.

In still another embodiment, the positive planographic printing plate precursor satisfies at least the condition (iii), and in which the IR absorbent is represented by the following general formula (I):

$$(D)_n\text{-A} \qquad (I)$$

wherein A represents a divalent or more polyvalent organic group; n indicates an integer of 2 or more; D represents at least one chromophoric group having an absorption in infrared ray range; two or more chromophoric groups may be the same or different, and when the chromophoric group has a charged partial structure, it may have an ionic group charged oppositely to the charge of the chromophoric group so as to neutralize the charge of the chromophoric group.

In still another embodiment, the positive planographic printing plate precursor satisfies at least the condition (i) and in which the ratio of the IR absorbing dye concentration in the upper thermosensitive layer to the IR absorbing dye concentration in the lower thermosensitive layer is 1.6 to 10.0.

In still another embodiment, the positive planographic printing plate precursor satisfies at least the above (i), and the amount of the IR absorbing dye added to each thermosensitive layer is from 0.01 to 60% by weight of the total solid content of each layer.

In still another embodiment, the positive planographic printing plate precursor satisfies at least the condition (i) or (ii), and in which the amount of the water-insoluble but alkali-soluble polymer compound in the thermosensitive layers is 30 to 99% by weight of the total solid content of the layers.

In still another embodiment, the positive planographic printing plate precursor satisfies at least the condition (ii) and in which the surface hardness of the upper thermosensitive layer is at least 0.50 GPa.

In still another embodiment, the positive planographic printing plate precursor satisfies at least the condition (iii), and in which the amount of the IR absorbing dye in each thermosensitive layer is 0.01 to 50% by weight of the total solid content of each layer.

In still another embodiment, the positive planographic printing plate precursor satisfies at least the condition (iii), and in which the amount of the water-insoluble but alkali-soluble polymer compound in the thermosensitive layers is 1 to 90% by weight of the total solid content of the layers.

In still another embodiment, the upper thermosensitive layer of the positive planographic printing plate precursor further contains a substance that substantially lowers the solubility of the alkali-soluble polymer compound.

In still another embodiment, the upper thermosensitive layer further contains, as the substance that substantially lowers the solubility of the alkali-soluble polymer compound, at least an onium dissolution inhibitor.

In still another embodiment, the water-insoluble but alkali-soluble polymer compound has, in the molecule, a functional group of any of phenolic hydroxyl groups, sulfonamido groups or active imido groups.

In still another embodiment, the water-insoluble but alkali-soluble polymer compound is a polymer compound prepared through polymerization of at least two of phenolic hydroxyl group-containing polymerizable monomers, sulfonamido group-containing polymerizable monomers, and active imido group-containing polymerizable monomers, or a polymer compound prepared through copolymerization of at least two such polymerizable monomers with any other polymerizable monomer.

In still another embodiment, the water-insoluble but alkali-soluble polymer compound is a copolymer prepared through copolymerization of a phenolic hydroxyl group-containing polymerizable monomer with a sulfonamido group-containing polymerizable monomer and/or an active imido group-containing polymerizable monomer, and the mixing ratio by weight of these components is 50/50 to 5/95.

In still another embodiment, the water-insoluble but alkali-soluble polymer compound is a copolymer prepared through copolymerization of a phenolic hydroxyl group-containing polymerizable monomer, a sulfonamido group-containing polymerizable monomer or an active imido group-containing polymerizable monomer with any other polymerizable monomer, and the copolymer contains at least 10 mol % of any of the phenolic hydroxyl group-containing polymerizable monomer, the sulfonamido group-containing polymerizable monomer and the active imido group-containing polymerizable monomer that render the copolymer soluble in alkali.

Though not clear, the effect and the function of the positive planographic printing plate precursor of the invention that satisfies the condition (i) will be as follows: Since the precursor has a multi-layered thermal recording layer and since both the two thermosensitive layers constituting the multi-layered thermal recording layer contain a light-heat converting agent, the sensitivity of the precursor is increased. In addition, since an IR absorbing dye is selected for the light-heat converting agent, it is miscible with the binder to a molecular level and can be uniformly dispersed in the thermosensitive layer. Accordingly, the light-heat converting agent is prevented from being localized in the layer, and the layer is prevented from being locally heated high to cause its ablation, and, as a result, the layer can be uniformly heated to ensure high sensitivity.

In one preferred embodiment of the case, the coating amount of the upper thermosensitive layer is limited to at most 0.4 g/m², and this produces another advantage. Specifically, when a developer has penetrated into the thermosensitive layer after exposed, the absolute amount of the IR absorbing dye which is a hydrophobic compound having the ability to retard the dissolution of the exposed layer is kept controlled to a predetermined level in the layer, and therefore, the sensitivity of the surface of the layer and therearound is kept high and the developability reduction to be caused by the IR absorbing dye in the layer can be prevented. Accordingly, the precursor of this preferred embodiment has a higher degree of sensitivity, and its image-forming capability is improved more.

In the positive planographic printing plate precursor of the invention that satisfies the condition (ii), the upper and lower thermosensitive layers of the two-layered thermosensitive layer contain different IR absorbents. Therefore, the precursor of the type well applies to IR laser recording systems, and its advantages are that its image-forming sensitivity is high and its latitude in development is broad. In one preferred embodiment of the precursor to have an increased surface hardness, it is effective to increase the IR absorbing dye concentration in the upper thermosensitive layer. In another preferred embodiment thereof to increase the surface hardness of the precursor, it is also effective to add a dissolution inhibitor to the upper thermosensitive layer. The dissolution inhibitor may be any and every compound having the ability to lower the dissolution rate of novolaks. The positive planographic printing plate precursor having the constitution as above, in which the surface hardness of the upper thermosensitive layer is at least 0.50 GPa, has good scratch resistance and is therefore free from defects to be caused by scratches in image areas. Another advantage of the precursor of the type is that it is processable in a direct plate-making process.

Also though not clear, the effect of the positive planographic printing plate precursor of the invention that satisfies the condition (iii) will be as follows: The precursor contains an IR absorbent (dye) having at least two chromophoric groups in one molecule. In this, therefore, at least two chromophoric groups of the dye exist near to each other, and the dye distribution is localized, and, as a result, the precursor is locally heated higher in some part. In addition, since the chromophoric groups in the dye bond to each other, the dye molecules associate with each other, and the relaxation from the excited condition of the dye is promoted. Accordingly, the quantity of heat generated by the dye increases, and therefore the sensitivity of the precursor is increased and the image-forming capability thereof is improved.

Moreover, since the IR absorbent in the thermosensitive layer in the precursor of this type has at least two chromophoric groups, its molecular weight is larger than that of IR absorbents having only one chromophoric group. Therefore, it is believed that, when the precursor is heated for imagewise exposure thereof, the IR absorbent therein will be free from ablation to scatter.

Moreover, the chromophoric groups bonding to each other via covalent bonding in the IR absorbent are not dissociated from each other when the IR absorbent is dissolved in a solvent in preparing the coating liquid for the recording layer, and the distance between the chromophoric groups in the IR absorbent does not increase through salt exchange with any other salt compound in the coating liquid. This is another advantage of the planographic printing plate precursor of this embodiment in that the effect of the IR absorbent therein does not decrease when the recording layer containing it is formed on a support.

An aluminum sheet of high thermal conductivity is generally used for the support of planographic printing plates. One problem with this is that the heat generated in the thermosensitive layer diffuses into the support of high thermal conductivity around the support, and, as a result, the heat generated around the support could not be effectively utilized in image formation. In the present invention, however, the concentration of the IR absorbing dye in the upper thermosensitive layer of the multi-layered recording layer is kept higher than that in the lower thermosensitive layer, and therefore the heat generated by the IR absorbing dye in the multi-layered recording layer is efficiently utilized for image formation, and high-sensitivity image recording on the precursor is possible.

DETAILED DESCRIPTION OF THE INVENTION

A positive planographic printing plate precursor (hereinafter, may be simply referred to as "the precursor") of the present invention is characterized in that it includes a positive thermosensitive layer including at least an upper thermosensitive layer and a lower thermosensitive layer. Both the upper and lower thermosensitive layers contain a water-insoluble but alkali-soluble polymer compound, and at least one of the layers contains an infrared (IR) absorbent dye. Specifically, the precursor of the invention comprises a support having successively disposed thereon a lower thermosensitive layer containing a water-insoluble but alkali-soluble polymer compound, and an upper thermosensitive layer containing a water-insoluble but alkali-soluble polymer compound, with solubility in an aqueous alkali solution increasing under heat, wherein at least one of the following conditions (i) to (iii) is satisfied: (i) both the upper thermosensitive layer and the lower thermosensitive layer contain an IR absorbing dye, with the ratio of the IR absorbing dye concentration in the upper thermosensitive layer to the IR absorbing dye concentration in the lower thermosensitive layer is 1.6 to 10.0; (ii) the upper thermosensitive layer and the lower thermosensitive layer contain different IR absorbing dyes; (iii) at least one of the upper thermosensitive layer and the lower thermosensitive layer contains an IR absorbent having, in one molecule, at least two chromophoric groups that absorb IR light, with the chromophoric groups in the IR absorbent bonding to each other via a covalent bond. Components constituting the thermosensitive layers in the precursor are described below.

IR Absorbing Dye

The IR absorbing dye is not specifically limited as long as it generates heat upon absorbing infrared light. Various dyes known as absorbing infrared light can be used.

Commercially available and known dyes described in various publications (e.g., Senryô binran, "Dye Handbook", edited by the Organic Synthetic Chemistry Association of Japan, 1970) can be used in the invention. Specific examples include azo dyes, metal complex azo dyes, pyrazolonazo dyes, anthraquinone dyes, phthalocyanine dyes, carbonium dyes, quinonimine dyes, methine dyes, and cyanine dyes. In the invention, dyes that absorb IR or near-IR light are particularly preferable since they are suited for use with IR or near-IR lasers.

Examples of dyes that absorb IR or near-IR light include: the cyanine dyes described in JP-A Nos. 58-125246, 59-84356, 59-202829 and 60-78787; the methine dyes in JP-A Nos. 58-173696, 58-181690 and 58-194595; the naphthoquinone dyes in JP-A Nos. 58-112793, 58-224793, 59-48187, 59-73996, 60-52940 and 60-63744; the squalilium dyes in JP-A No. 58-112792; and the cyanine dyes in British Patent 434,875.

Other examples of preferable dyes include: the near IR-absorbing sensitizers described in U.S. Pat. No. 5,156,938; the substituted arylbenzo(thio)pyrylium salts in U.S. Pat. No. 3,881,924; the trimethinethiapyrylium salts in JP-A No. 57-142645 (U.S. Pat. No. 4,327,169); the pyrylium compounds in JP-A Nos. 58-181051, 58-220143, 59-41363, 59-84248, 59-84249, 59-146063 and 59-146061; the cyanine dyes in JP-A No. 59-216146; the pentamethinethiopyrylium salts in U.S. Pat. No. 4,283,475; and the pyrylium compounds in JP-B Nos. 5-13514 and 5-19702. Examples of commercial products usable herein include Epolin's Epolight III-178, Epolight III-130, and Epolight III-125.

Still other examples of preferable dyes include the near IR absorbing dyes of formulae (I) and (II) described in U.S. Pat. No. 4,756,993. These dyes exhibit a very strong interaction with alkali-soluble resins and are therefore excellent for use in the upper thermosensitive layer due to their resistance to alkali developer in the non-exposed region.

The IR absorbing dyes may be added to both the upper thermosensitive layer and the lower thermosensitive layer. When added to both layers, the IR absorbing dye added to the lower thermosensitive layer may be the same as or different from the IR absorbing dye added to the upper thermosensitive layer.

In the precursor that satisfies condition (i), the amount of the IR absorbing dye in each thermosensitive layer is 0.01 to 60% by weight, but preferably 0.1 to 40% by weight, and even more preferably 0.5 to 30% by weight of the total solid content of each layer. When the dye amount is less than 0.01% by weight, sensitivity becomes low. When the dye amount exceeds 50% by weight, the thermosensitive layer loses its uniformity and durability becomes poor.

In the precursor that satisfies condition (i), it is important that the concentration of the IR absorbing dye in the upper thermosensitive layer is higher than the concentration of the IR absorbing dye in the lower thermosensitive layer. Namely, it is important for the ratio of the IR absorbing dye concentration (a % by weight, in terms of solid content) in the upper thermosensitive layer to the IR absorbing dye concentration (b % by weight, in terms of solid content) in the lower thermosensitive layer to be larger than 1 (a/b>1). It is also important that the ratio of the IR absorbing dye concentration in the upper thermosensitive layer to the IR absorbing dye concentration in the lower thermosensitive layer (a/b), i.e. the value obtained by dividing the IR absorbing dye concentration in the upper thermosensitive layer by the IR absorbing dye concentration in the lower thermosensitive layer is 1.6 to 10.0, in order to fabricate a printing plate precursor of high sensitivity. More preferably, the ratio is 3.0 to 6.0. Increased sensitivity can be expected even if the ratio (a/b) is smaller than 1.6, due to the IR absorbing dye concentration in the upper thermosensitive layer being higher than the IR absorbing dye concentration in the lower thermosensitive layer, but the effect is relatively small. When the ratio is larger than 10.0, developability of the upper thermosensitive layer during development tends to drop. In addition, it becomes extremely easy for ablation to occur and there is the potential for the exposure device to be stained by scattering of the dye due to the ablation. Therefore, a ratio larger than 10.0 is unfavorable.

The IR absorbing dye concentration in each thermosensitive layer can be calculated from the mixing amount of coating solutions for each layer. In general, it may be obtained by dissolving the thermosensitive layers in a suitable solvent and analyzing amount of solid components of the IR absorbing dye and the other components in the solution.

In the precursor that satisfies condition (ii), the amount of the IR absorbing dye added to the upper thermosensitive layer is 3 to 50% by weight, but preferably 5 to 40% by weight, and more preferably 8 to 35% by weight of the overall weight of the layer. When the amount of the IR absorbing dye in the upper thermosensitive layer is smaller than 3% by weight, sensitivity becomes low, and when the amount is larger than 50% by weight, the photosensitive layer loses its uniformity and the durability becomes poor.

Examples of particularly preferable IR absorbing dyes for the lower thermosensitive layer include dyes having a functional group soluble in alkali developer or having a hydrophilic functional group.

Specific examples of IR absorbing dyes are shown below. However, the invention is not limited to these examples.

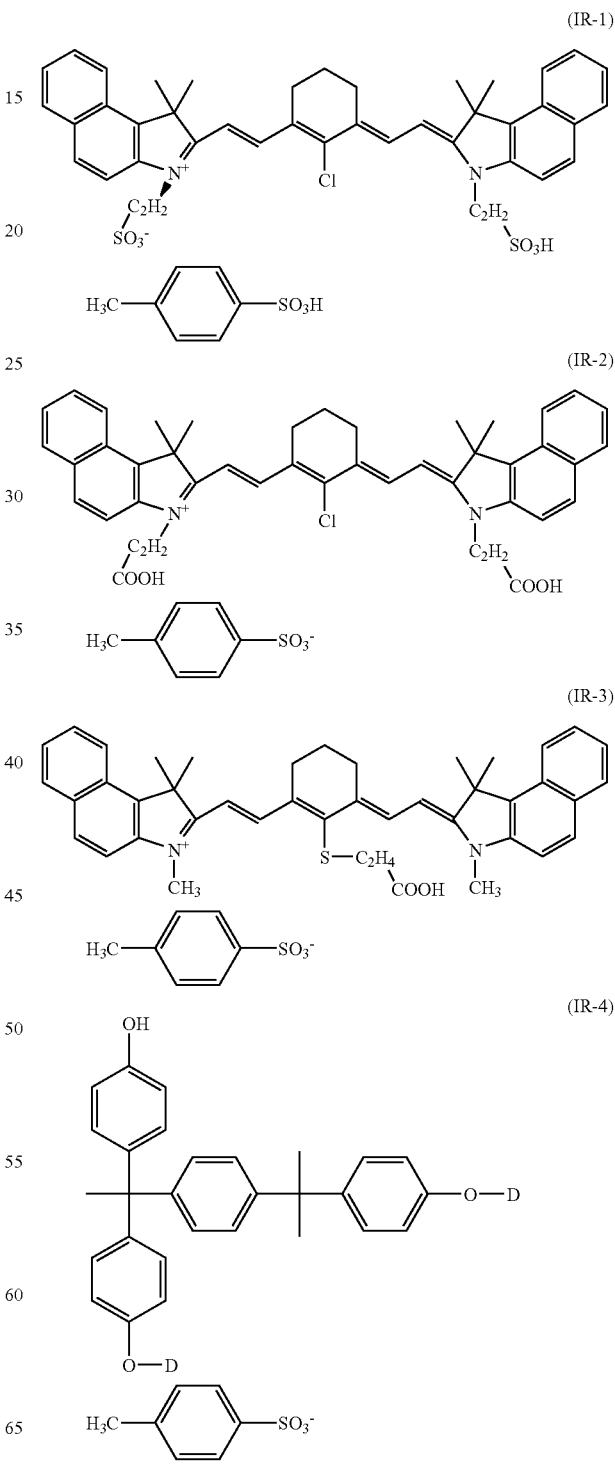

D =

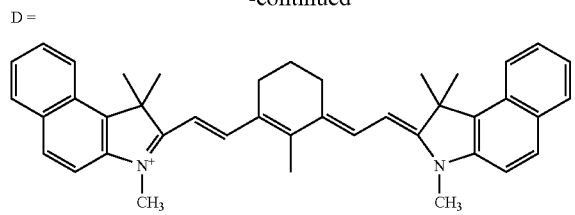

The amount of the IR absorbing dye added to the lower thermosensitive layer is 0.1 to 10% by weight, but preferably 0.5 to 8% by weight, and more preferably 1 to 6% by weight of the overall weight of the layer. When the amount of the IR absorbing dye in the lower thermosensitive layer is smaller than 0.1% or larger than 10%, sensitivity becomes low.

The IR absorbent in the precursor satisfying condition (iii) is characterized in that it has at least two chromophoric groups in one molecule, with the chromophoric groups bonding to each other via a covalent bond.

Similar to ordinary IR absorbents included in recording materials on which an image is formed by exposing the recording materials to IR light, the IR absorbent generates heat when exposed to IR light, whereby an image is recorded by the generated heat. Accordingly, the precursor satisfying condition (iii) must include an IR absorbent that efficiently converts the light of an IR laser into heat. The chromophoric groups in the IR absorbent for use herein have an absorption in the IR range. Concretely, they have an absorption in the wavelength range of 720 nm to 1200 nm, and preferably have an absorption maximum in that range.

As long as it has the characteristics described above, there are no particular limitations on the IR absorbent used in the precursor satisfying condition (iii). Preferably, the IR absorbent is one represented by the following general formula (I):

$$(D)_n\text{-A} \tag{I}$$

wherein A represents a polyvalent organic group; n indicates an integer of 2 or higher; and D represents at least one chromophoric group having an absorption in the IR range. When D represents two or more chromophoric groups, the chromophoric groups may be the same or different. When a partial structure of the chromophoric group has a charge, it may be accompanied by an ion that has a charge opposite to the charge of the partial structure of the chromophoric group to neutralize the charge.

Although the chromophoric groups represented by D in formula (I) may be the same or different, they can be easily produced when they are the same.

The IR absorbent having at least two chromophoric groups in one molecule will now be described in detail, and specific examples include the compounds (IR-1) to (IR-51) shown below. In compounds (IR-1) to (IR-51), the basic skeleton, the organic group A functioning as a linking group in formula (I) (represented by $A^1$ to $A^{12}$), the substituents in the chromophoric group (represented by $R^1$ to $R^4$), and the counter ion $X^-$ to neutralize the charge of the chromophoric groups are concretely shown. However, the invention is not limited to these.

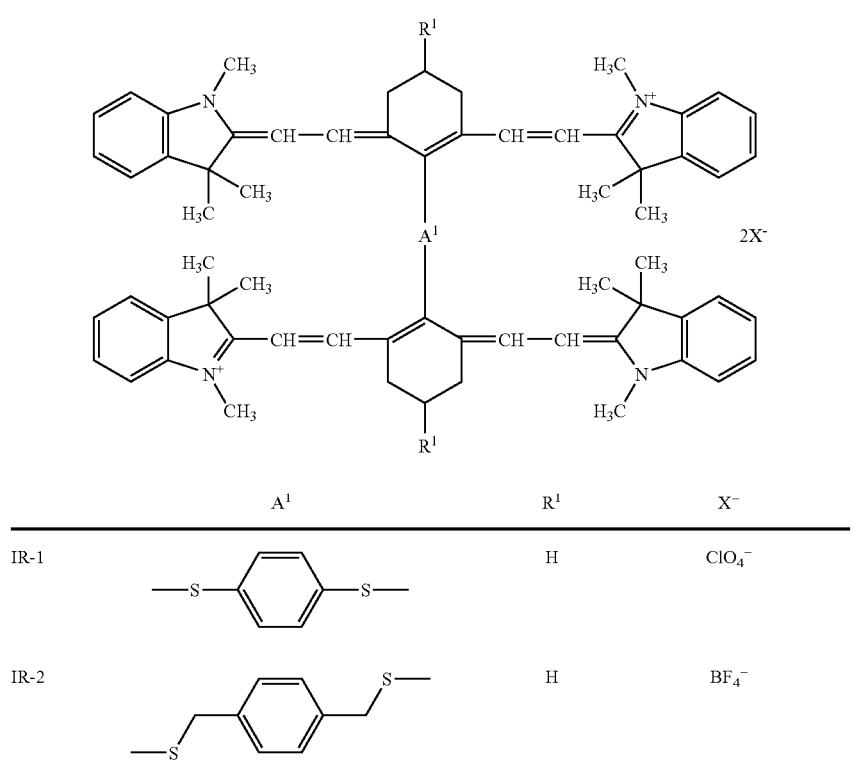

-continued
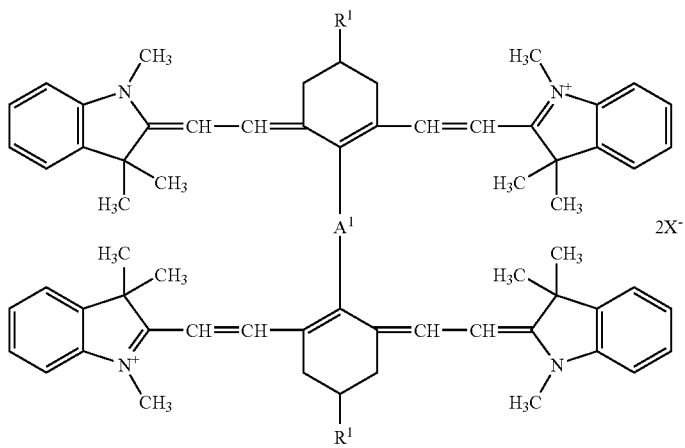
| | $A^1$ | $R^1$ | $X^-$ |
|---|---|---|---|
| IR-3 | 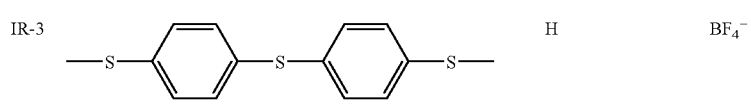 | H | $BF_4^-$ |
| IR-4 | 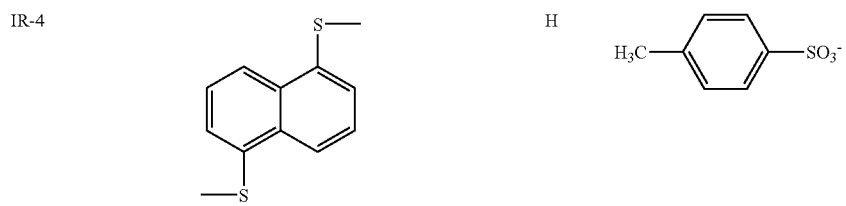 | H | 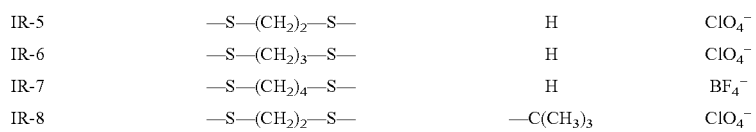 |
| IR-5 | —S—(CH$_2$)$_2$—S— | H | $ClO_4^-$ |
| IR-6 | —S—(CH$_2$)$_3$—S— | H | $ClO_4^-$ |
| IR-7 | —S—(CH$_2$)$_4$—S— | H | $BF_4^-$ |
| IR-8 | —S—(CH$_2$)$_2$—S— | —C(CH$_3$)$_3$ | $ClO_4^-$ |
| IR-9 | 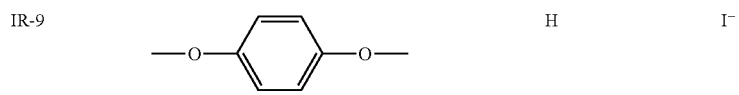 | H | $I^-$ |
| IR-10 | 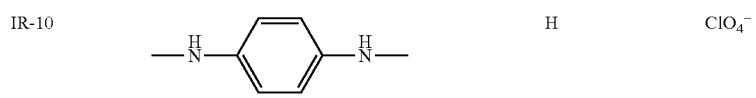 | H | $ClO_4^-$ |
| IR-11 |  | H | $ClO_4^-$ |
| IR-12 | 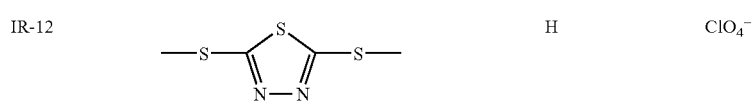 | H | $ClO_4^-$ |

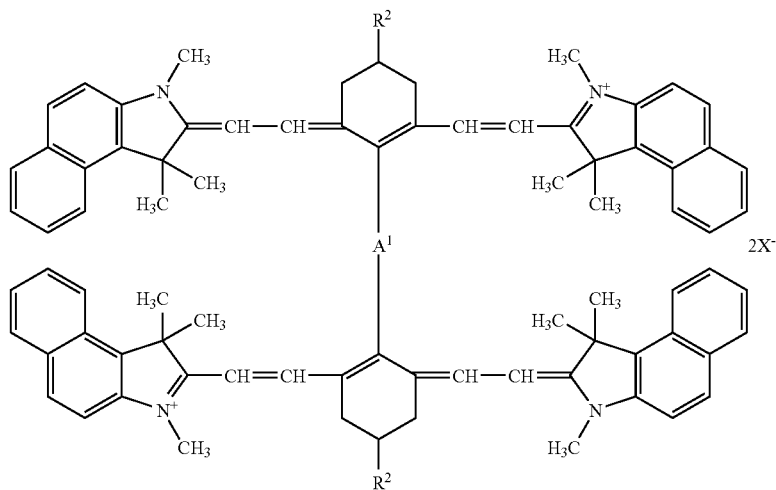
|       | A² | R² | X⁻ |
|-------|----|----|----|
| IR-13 | —S—C₆H₄—S— (para) | H | H₃C—C₆H₄—SO₃⁻ |
| IR-14 | —S—(CH₂)₃—S— | H | H₃C—C₆H₄—SO₃⁻ |
| IR-15 | —S—(CH₂)₄—S— | —C(CH₃)₃ | ClO₄⁻ |
| IR-16 | —O—C₆H₄—O— (para) | H | I⁻ |
| IR-17 | —NH—C₆H₄—NH— (para) | H | ClO₄⁻ |
| IR-18 | —S—(1,3,4-thiadiazol-2,5-diyl)—S— | H | ClO₄⁻ |

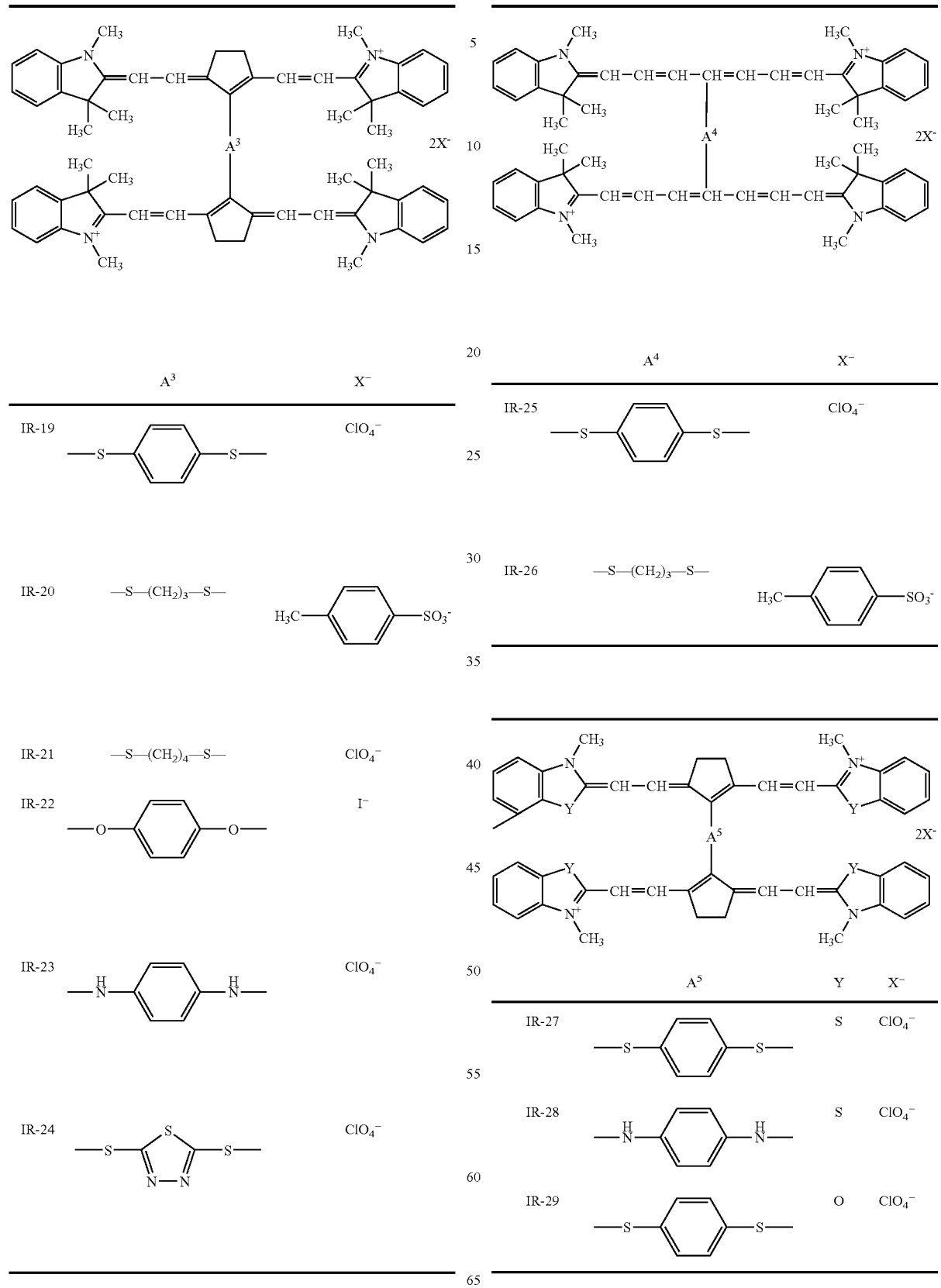

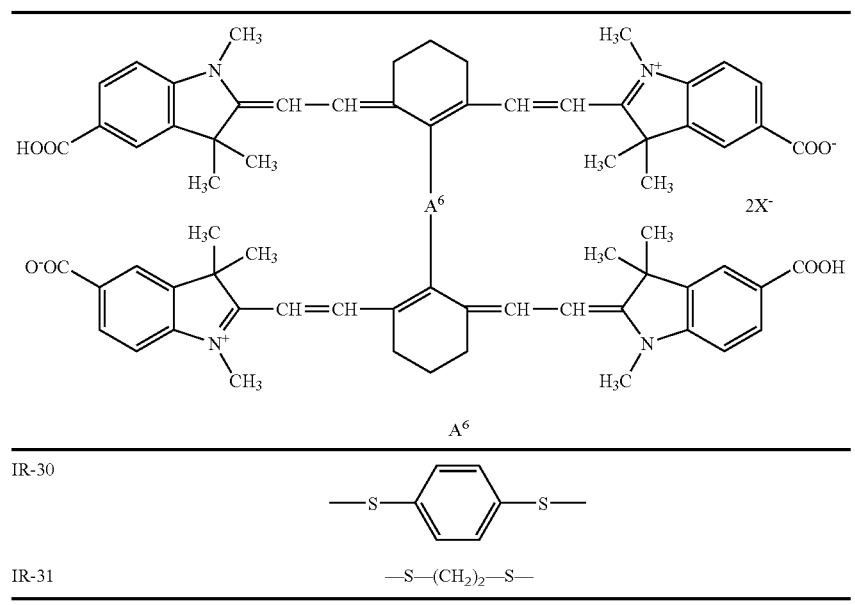
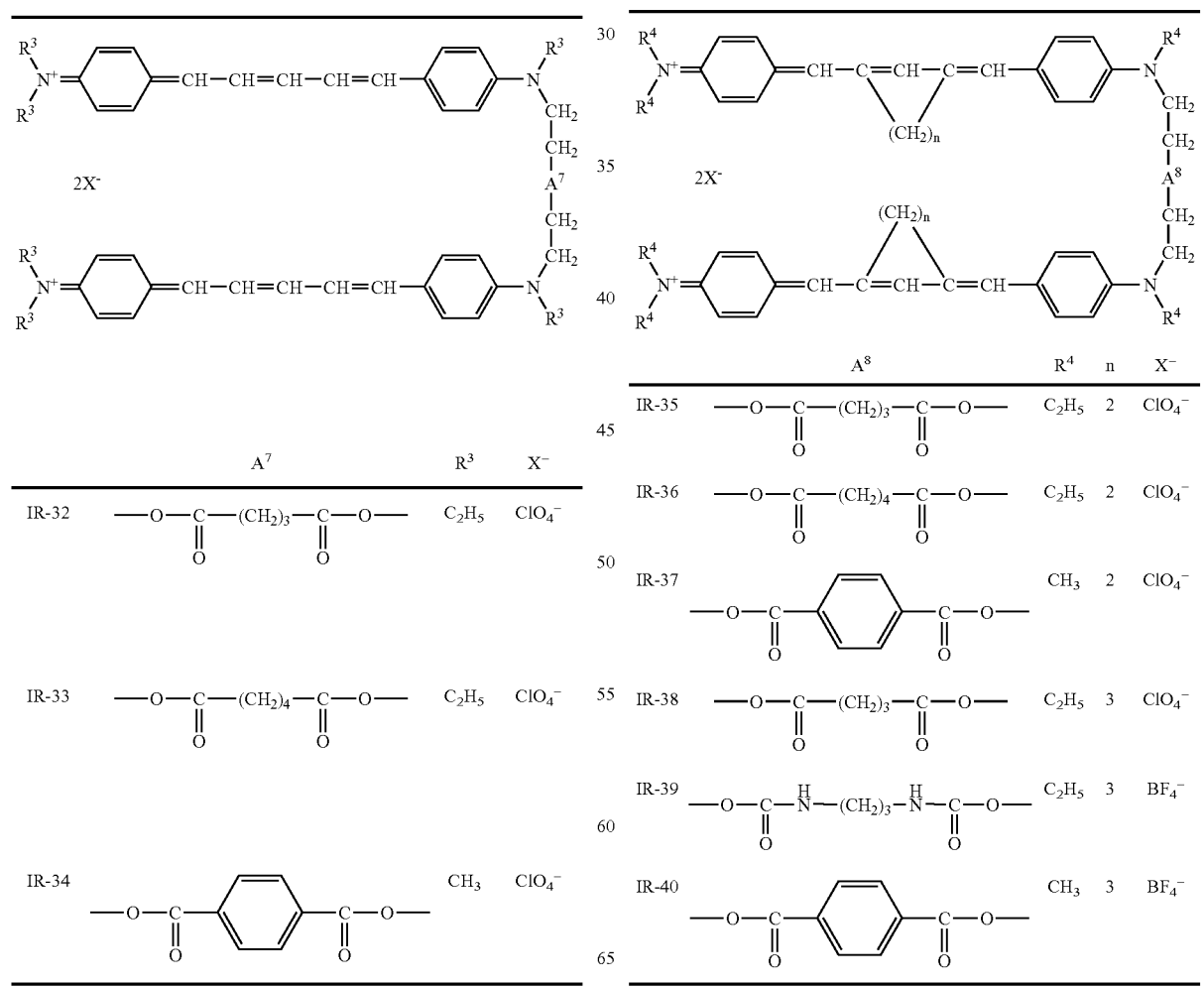

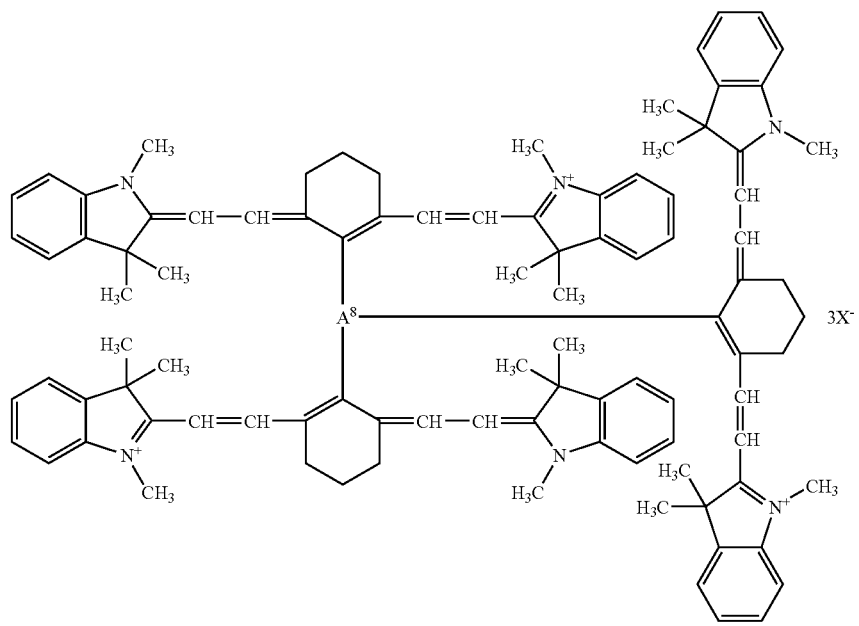
|       | A⁹ | X⁻ |
|-------|----|-----|
| IR-41 | 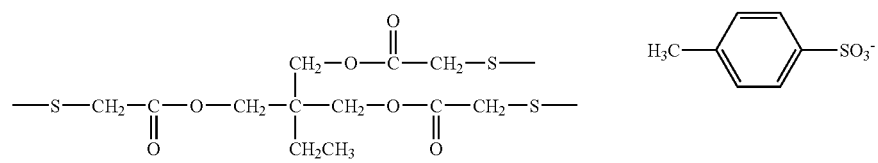 | H₃C—⟨benzene⟩—SO₃⁻ |
| IR-42 | 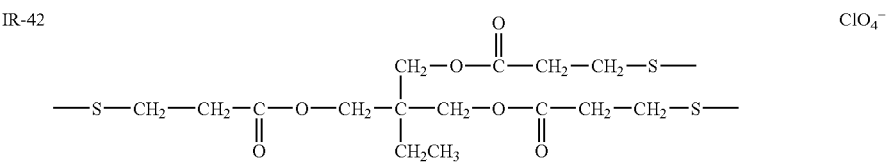 | ClO₄⁻ |

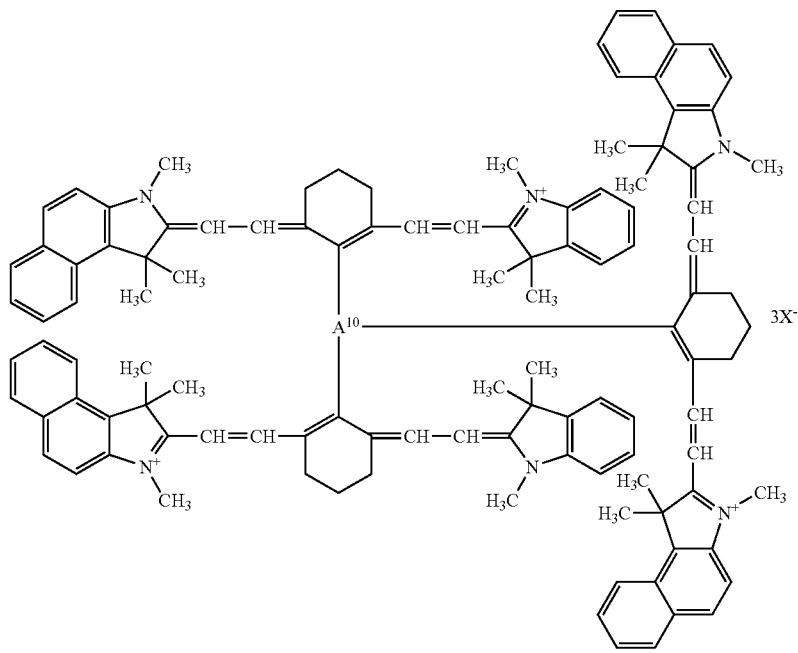
| | $A^{10}$ | $X^-$ |
|---|---|---|
| IR-43 | 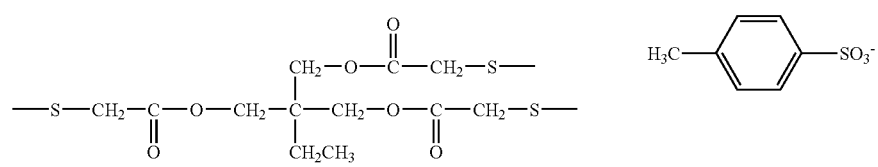 | |
| IR-44 | 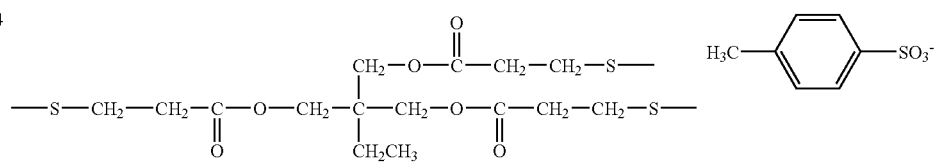 | |

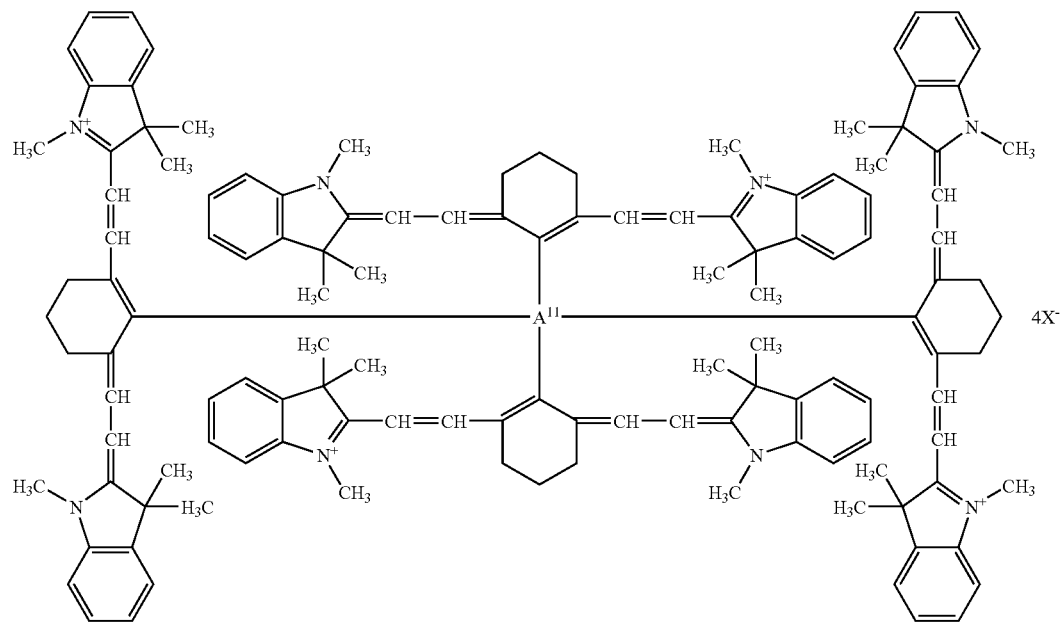
|  | $A^{11}$ | $X^-$ |
|---|---|---|
| IR-45 | 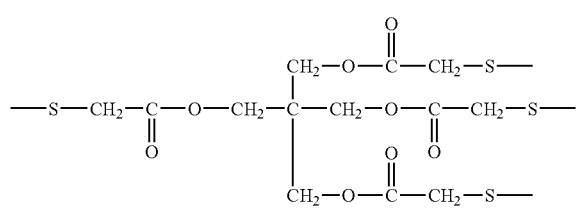 | 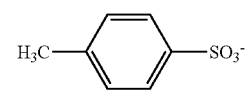 |
| IR-46 | 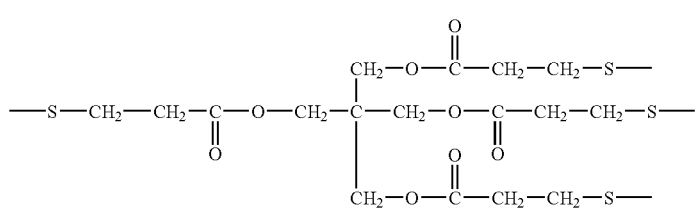 | 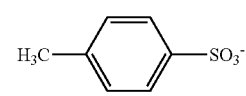 |

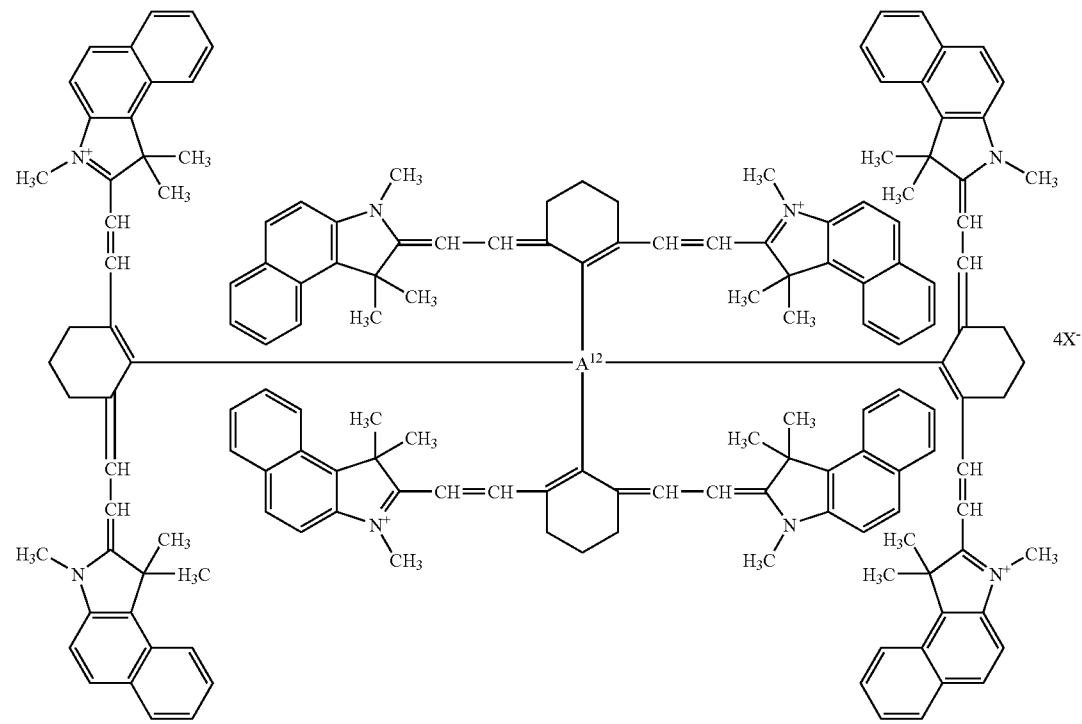
| | $A^{12}$ | $X^-$ |
|---|---|---|
| IR-47 | 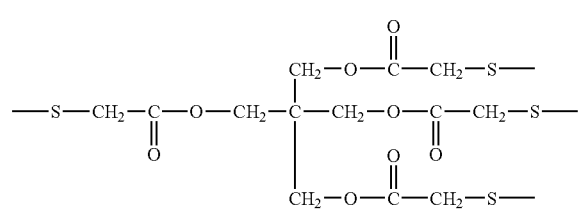 | 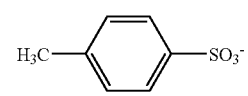 |
| IR-48 | 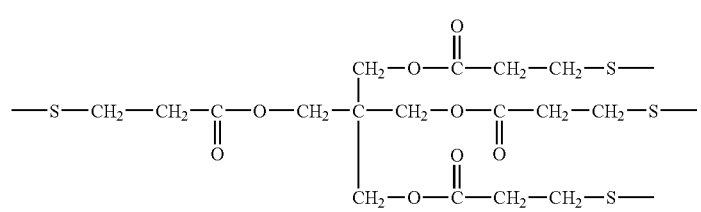 | 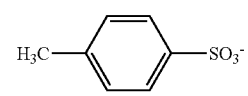 |
| IR-49 | 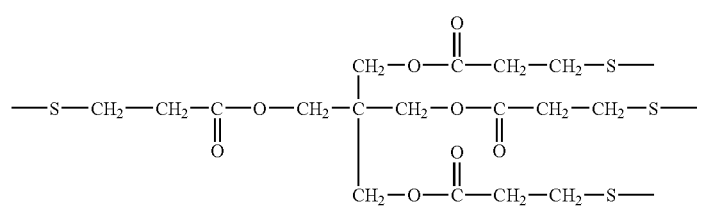 | $ClO_4^-$ |

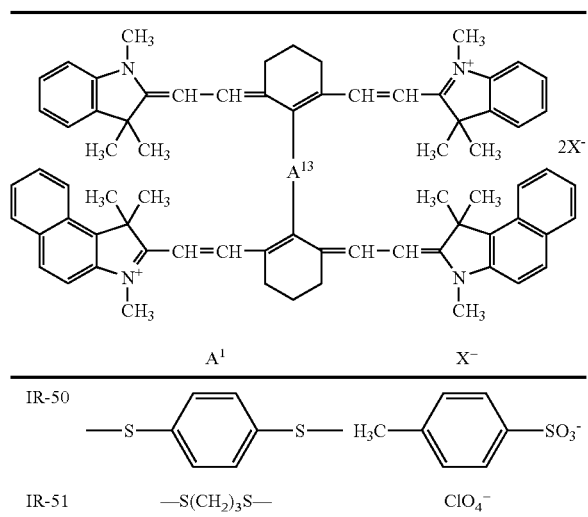

Compounds (IR-1) to (IR-49) are easy to synthesize because the two chromophoric groups are the same, but other compounds, such as (IR-50) and (IR-51), in which the chromophoric groups are different, are also usable.

Methods of producing the IR absorbents of the precursor satisfying condition (iii) will now be described.

The IR absorbents of formula (I) can be produced according to known synthetic organic technology. Specifically, they can be produced according to the methods described in JP-A No. 8-95197 and Japanese Patent No. 2758136. When the valence of the organic group (A) is at least three, it is not necessary for all of the linking sites in the group (A) to bond to the dye portions. Mixtures of compounds in which at least two chromophoric groups are bonded can also be used.

The IR absorbent may be added to the recording layer along with other components, or added to a layer other than the recording layer when the precursor is fabricated. One type or two or more types of the infrared absorbents may be added.

In the precursor that satisfies condition (iii), the amount of the IR absorbent is 0.01 to 50% by weight, but preferably 0.1 to 20% by weight, and more preferably 0.5 to 15% by weight of the total solid content of the recording layer. When the amount of the IR absorbent is less than 0.01% by weight, image formability becomes poor. When the amount is greater than 50% by weight, there is the potential for the non-image area to be contaminated.

In addition to the IR absorbent, other IR-absorbing pigments or dyes may be added to the precursor of the invention to further improve image formability.

Examples of such pigments include commercially available pigments and pigments described in the *Color Index* (C.I.) catalog, *Saishin ganryô binran* ("Recent Pigment Catalog" (edited by the Japan Pigment Technology Association, 1977), *Saishin ganryô ôyô gijutsu* ("Recent Pigment Application Technology", published by CMC, 1986), and *Insatsu inki gijutsu* ("Ink Printing Technology", published by CMC, 1984).

Specific examples include black pigments, yellow pigments, orange pigments, brown pigments, red pigments, purple pigments, blue pigments, green pigments, fluorescent pigments, metal powder pigments, and polymer-bonded colorants. More specific examples include insoluble azo pigments, azo-lake pigments, condensed azo pigments, chelate-azo pigments, phthalocyanine pigments, anthraquinone pigments, perylene and perinone pigments, thioindigo pigments, quinacridone pigments, dioxazine pigments, isoindolinone pigments, quinophthalone pigments, dyed lake pigments, azine pigments, nitroso pigments, nitro pigments, natural pigments, fluorescent pigments, inorganic pigments, and carbon black.

These pigments can be used whether or not they have been surface-treated. Examples of the surface treatment include coating the pigment particles with resin or wax, adhering a surfactant to the pigment particles, or bonding a reactive substance (e.g., silane coupling agent, epoxy compound, polyisocyanate) to the pigment particles. These surface treatments are described in, for example, *Kinzoku sekken no seishitsu to ôyô* ("Properties and Applications of Metal Soap", published by Miyuki Shobô), *Insatsu inki gijutsu*, and *Saishin ganryô ôyô gijutsu*.

Pigment particle size is preferably 0.01 µm to 10 µm, more preferably 0.05 µm to 1 µm, and even more preferably 0.1 µm to 1 µm. A particle size smaller than 0.01 µm is unpreferable in terms of the stability of the pigment particles dispersed in the recording layer coating solution. A particle size larger than 10 µm is also unpreferable in terms of recording layer uniformity.

The pigment can be dispersed by known dispersion techniques used in the production of inks and toners. Examples of machines for effecting the dispersion include ultrasonicators, sand mills, attritors, pearl mills, super mills, ball mills, impellers, dispersers, KD mills, colloid mills, dynatrons, three-roll mills, and pressure kneaders. Details can be found in *Saishin ganryô ôyô gijutsu*.

Examples of the dyes include commercially available dyes and dyes described in various publications (e.g., *Ganryô binran*, "Dye Handbook", edited by The Society of Synthetic Organic Chemistry, Japan, 1970). Specific examples include azo dyes, metal complex azo dyes, pyrazolonazo dyes, anthraquinone dyes, phthalocyanine dyes, carbonium dyes, quinonimine dyes, methine dyes, cyanine dyes, diimmonium dyes and aminium dyes.

In the present invention, pigments and dyes capable of absorbing IR or near-IR light are preferable because they are suited for use with IR or near-IR lasers.

Carbon black is preferable as the pigment absorbing IR or near-IR light. Examples of preferable dyes absorbing IR or near-IR light include the cyanine dyes described in JP-A Nos. 58-125246, 59-84356, 59-202829 and 60-78787; the methine dyes in JP-A Nos. 58-173696, 58-181690, and 58-194595; the naphthoquinone dyes in JP-A Nos. 58-112793, 58-224793, 59-48187, 59-73996, 60-52940, and 60-63744; the squalilium dyes in JP-A No. 58-112792; the cyanine dyes in British Patent No. 434,875; and the dihydropyrimidine-squalilium dyes in U.S. Pat. No. 5,380,635.

Other examples of preferable dyes include the near IR-absorbing sensitizers described in U.S. Pat. No. 5,156,938; the substituted arylbenzo(thio)pyrylium salts in U.S. Pat. No. 3,881,924; the trimethinethiapyrylium salts in JP-A No. 57-142645 (U.S. Pat. No. 4,327,169); the pyrylium compounds in JP-A Nos. 58-181051, 58-220143, 59-41363, 59-84248, 59-84249, 59-146063 and 59-146061; the cyanine dyes in JP-A No. 59-216146; the pentamethinethiopyrylium salts in U.S. Pat. No. 4,283,475; and the pyrylium compounds in JP-B Nos. 5-13514 and 5-19702. Examples of commercial products usable herein include Epolight III-178, Epolight III-130, Epolight III-125 and Epolight IV-62A (all by Epolin).

Still other examples of preferable dyes include the near-IR absorbing dyes of formulae (I) and (II) described in U.S. Pat. No. 4,756,993.

Because the pigments or dyes are combined with the specific IR absorbent, the amount added when the pigments and dyes are used is preferably about 0.01 to 20% by weight of the total solid content of the recording layer. More preferably, the amount of the dye is 0.5 to 10% by weight and the amount of the pigment is from 0.1 to 5% by weight. When the amount of the pigments or dyes is less than 0.01% by weight, effects resulting from the inclusion of the pigments or dyes are not evident. An amount larger than 20% by weight is also unpreferable because of the potential for increased sensitivity resulting from the specific IR absorbent to be adversely effected.

Water-Insoluble but Alkali-Soluble Polymer

The water-insoluble but alkali-soluble polymer compound (hereinafter referred to as "the alkali-soluble polymer") used in the upper and lower thermosensitive layers includes homopolymers having in a molecule an acid group in a main chain and/or side chain, copolymers of these homopolymers, and mixtures thereof. Accordingly, both the upper and lower thermosensitive layers dissolve in alkali developer.

There are no particular limitations on the alkali-soluble polymer, and conventionally known alkali-soluble polymers can be used. However, alkali-soluble polymers including in the main chain and/or side chains one of the following acid groups (1) to (6) are particularly preferable in terms of solubility in alkali developer.

(1) Phenolic hydroxyl group (—Ar—OH),
(2) Sulfonamido group (—SO$_2$NH—R),
(3) Substituted sulfonamidic acid group (hereinafter referred to as "active imido group") (—SO$_2$NHCOR, —SO$_2$NHSO$_2$R, —CONHSO$_2$R),
(4) Carboxylic acid group (—CO$_2$H),
(5) Sulfonic acid group (—SO$_3$H),
(6) Phosphoric acid group (—OPO$_3$H$_2$)

In the above (1) to (6), Ar indicates an optionally-substituted divalent aryl linking group, and R indicates an optionally-substituted hydrocarbon group.

Polymer compounds having in a molecule any of (1) a phenolic hydroxyl group, (2) a sulfonamido group, or (3) an active imido group, which are all functional groups, are preferable. Examples thereof include the following, but the polymer compound is not limited to the same.

(1) Examples of polymer compounds containing a phenolic hydroxyl group include novolak resins such as phenol-formaldehyde resins, m-cresol-formaldehyde resins, p-cresol-formaldehyde resins, m-/p-mixed cresol-formaldehyde resins and phenol/cresol (m-, p-, or m-/p-) mixed formaldehyde resins; and pyrogallol-acetone resins. Polymer compounds having a phenolic hydroxyl group in the side chains are also preferable. The polymer compounds having a phenolic hydroxyl group in the side chains are, for example, those prepared through homopolymerization of low-molecular polymerizable monomers having at least one phenolic hydroxyl group and at least one polymerizable unsaturated bond, or those prepared through copolymerization of such monomers with any other polymerizable monomer.

Examples of the polymerizable monomers containing a phenolic hydroxyl group include phenolic hydroxyl group-having acrylamides, methacrylamides, acrylates, methacrylates and hydroxystyrenes having a phenolic hydroxyl group. Specific examples include N-(2-hydroxyphenyl)acrylamide, N-(3-hydroxyphenyl)acrylamide, N-(4-hydroxyphenyl)acrylamide, N-(2-hydroxyphenyl)methacrylamide, N-(3-hydroxyphenyl)methacrylamide, N-(4-hydroxyphenyl)methacrylamide, o-hydroxyphenyl acrylate, m-hydroxyphenyl acrylate, p-hydroxyphenyl acrylate, o-hydroxyphenyl methacrylate, m-hydroxyphenyl methacrylate, p-hydroxyphenyl methacrylate, o-hydroxystyrene, m-hydroxystyrene, p-hydroxystyrene, 2-(2-hydroxyphenyl)ethyl acrylate, 2-(3-hydroxyphenyl)ethyl acrylate, 2-(4-hydroxyphenyl)ethyl acrylate, 2-(2-hydroxyphenyl)ethyl methacrylate, 2-(3-hydroxyphenyl)ethyl methacrylate and 2-(4-hydroxyphenyl)ethyl methacrylate. Two or more such phenolic hydroxyl group-containing resins may be used in combination. In addition, the condensation polymer of a phenol substituted with an alkyl group having 3 to 8 carbon atoms, and formaldehyde, for example, t-butylphenol-formaldehyde resins and octylphenol-formaldehyde resins, described in U.S. Pat. No. 4,123,279 can also be used.

(2) Examples of alkali-soluble polymer compounds including a sulfonamido group include those obtained through homopolymerization of sulfonamido group-containing polymerizable monomers, and those obtained through copolymerization of such monomers with other polymerizable monomer. The sulfonamido group-containing polymerizable monomers are, for example, low-molecular polymerizable monomers having in a molecule at least one sulfonamido group —NH—SO$_2$— with at least one hydrogen atom bonded to the nitrogen atom, and at least one polymerizable unsaturated bond. In particular, low-molecular compounds having an acryloyl, allyl or vinyloxy group, and an unsubstituted or mono-substituted aminosulfonyl group or a substituted sulfonylimino group, are preferable.

(3) Preferable examples of alkali-soluble polymer compounds containing an active imido group are those having an active imido group in a molecule. The polymer compounds are, for example, those obtained through homopolymerization of low-molecular polymerizable monomers having in a molecule at least one active imido group and at least one polymerizable unsaturated bond, or those obtained through copolymerization of such monomers with other polymerizable monomers.

Specific examples of the polymerizable monomer include N-(p-toluenesulfonyl)methacrylamide and N-(p-toluenesulfonyl)acrylamide.

(4) Examples of alkali-soluble polymers having a carboxylic acid group include polymers having as essential components minimum constituent units derived from compounds having in a molecule at least one carboxylic acid group and at least one polymerizable unsaturated group.

(5) Examples of alkali-soluble polymers containing a sulfonic acid group include those having as essential components minimum constituent units derived from compounds having in a molecule at least one sulfonic acid group and at least one polymerizable unsaturated group.

(6) Examples of alkali-soluble polymers containing a phosphoric acid group include polymers having as essential components minimum constituent units derived from compounds having in a molecule at least one phosphoric acid group and at least one polymerizable unsaturated group.

It is not necessary for the minimum constituent units that include an acid group selected from the above (1) to (6) and constitute the alkali-soluble polymer to be limited to only one kind. The alkali-soluble polymer may be a copolymer containing at least two different types of minimum constituent units having the same acid group, or containing at least two different types of minimum constituent units having different acid groups.

The copolymer can be produced by conventionally known graft copolymerization, block copolymerization or random copolymerization.

The alkali-soluble polymer compound for use in the invention is preferable obtained by polymerizing at least two of a phenolic hydroxyl group-containing polymerizable monomer, a sulfonamido group-containing polymerizable monomer and an active imido group-containing polymerizable monomer such as those mentioned above, or by copolymerizing at least two these polymerizable monomers with another polymerizable monomer. When a phenolic hydroxyl group-containing polymerizable monomer is copolymerized with a sulfonamido group-containing polymerizable monomer and/or an active imido group-containing polymerizable monomer, the mixing ratio by weight of these components is preferably 50/50 to 5/95, and more preferably 40/60 to 10/90.

When the alkali-soluble polymer is obtained by copolymerizing a phenolic hydroxyl group-containing polymerizable monomer, a sulfonamido group-containing polymerizable monomer or an active imido group-containing polymerizable monomer with another polymerizable monomer, the copolymer preferably contains at least 10 mol %, and more preferably at least 20 mol %, of the monomer that renders the polymer alkali-soluble. If the monomer content of the copolymer is less than 10 mol %, the alkali-solubility of the copolymer easily becomes insufficient and improvement of development latitude may not be satisfactorily attained.

The monomer component copolymerized with the phenolic hydroxyl group-containing polymerizable monomer, the sulfonamido group-containing polymerizable monomer or the active imido group-containing polymerizable monomer includes, for example, the following compounds (m1) to (m12) to which the invention is not limited:

(m1) aliphatic hydroxyl group-having acrylates and methacrylates, such as 2-hydroxyethyl acrylate and 2-hydroxyethyl methacrylate;

(m2) alkyl acrylates, such as methyl acrylate, ethyl acrylate, propyl acrylate, butyl acrylate, amyl acrylate, hexyl acrylate, octyl acrylate, benzyl acrylate, 2-chloroethyl acrylate and glycidyl acrylate;

(m3) alkyl methacrylates, such as methyl methacrylate, ethyl methacrylate, propyl methacrylate, butyl methacrylate, amyl methacrylate, hexyl methacrylate, cyclohexyl methacrylate, benzyl methacrylate, 2-chloroethyl methacrylate and glycidyl methacrylate;

(m4) acrylamides and methacrylamides, such as acrylamide, methacrylamide, N-methylolacrylamide, N-ethylacrylamide, N-hexylmethacrylamide, N-cyclohexylacrylamide, N-hydroxyethylacrylamide, N-phenylacrylamide, N-nitrophenylacrylamide and N-ethyl-N-phenylacrylamide;

(m5) vinyl ethers such as ethyl vinyl ether, 2-chloroethyl vinyl ether, hydroxyethyl vinyl ether, propyl vinyl ether, butyl vinyl ether, octyl vinyl ether and phenyl vinyl ether;

(m6) vinyl esters such as vinyl acetate, vinyl chloroacetate, vinyl butyrate and vinyl benzoate;

(m7) styrenes such as styrene, α-methylstyrene, methylstyrene and chloromethylstyrene;

(m8) vinyl ketones such as methyl vinyl ketone, ethyl vinyl ketone, propyl vinyl ketone and phenyl vinyl ketone;

(m9) olefins such as ethylene, propylene, isobutylene, butadiene and isoprene;

(m10) N-vinylpyrrolidone, acrylonitrile and methacrylonitrile;

(m11) unsaturated imides, such as maleimide, N-acryloylacrylamide, N-acetylmethacrylamide, N-propionylmethacrylamide and N-(p-chlorobenzoyl)methacrylamide; and (m12) unsaturated carboxylic acids such as acrylic acid, methacrylic acid, maleic anhydride and itaconic acid.

The alkali-soluble polymer preferably includes a phenolic hydroxyl group in view of good image formability by exposure to an IR laser. Preferable examples include novolak resins such as phenol-formaldehyde resins, m-cresol-formaldehyde resins, p-cresol-formaldehyde resins, m-/p-mixed cresol-formaldehyde resins and phenol/cresol (m-, p-, or m-/p-) mixed formaldehyde resins; and pyrogallol-acetone resins.

As the phenolic hydroxyl group-containing alkali-soluble polymer, also usable are condensation polymers of formaldehyde and a phenol including as a substituent group an alkyl group having 3 to 8 carbon atoms (e.g., t-butylphenol-formaldehyde resins and octylphenol-formaldehyde resin), as described in U.S. Pat. No. 4,123,279.

When the alkali-soluble polymer is a homopolymer or copolymer of a phenolic hydroxyl group-containing polymerizable monomer, a sulfonamido group-containing polymerizable monomer and/or an active imido group-containing polymerizable monomer, the alkali-soluble polymer preferably has a weight-average molecular weight of at least 2,000 and a number-average molecular weight of at least 500. More preferably, the weight-average molecular weight is 5,000 to 300,000, the number-average molecular weight is 800 to 250,000, and the degree of dispersion (weight-average molecular weight/number-average molecular weight) is 1.1 to 10.

When the alkali-soluble polymer is a resin, such as phenol-formaldehyde resin or cresol-formaldehyde resin, the resin preferably has a weight-average molecular weight of 500 to 20,000 and a number-average molecular weight of 200 to 10,000.

The alkali-soluble polymer used in the lower thermosensitive layer is preferably an acrylic resin, with the acrylic resin preferably including a sulfonamido group.

The alkali-soluble polymer used in the upper thermosensitive layer is preferably a phenolic hydroxyl group-containing resin, since the resin produces strong hydrogen bonds in the non-exposed area, and some of the hydrogen bonds in the resin are readily released in the exposed area. More preferably, the resin is a novolak resin.

One or more such alkali-soluble polymer compounds may be used in the invention either singly or as combined. With respect to the precursor that satisfies condition (i) or (ii) the amount of the alkali-soluble polymer is 30 to 99% by weight, preferably 40 to 95% by weight, and more preferably 50 to 90% by weight of the total solid content of the thermosensitive layer. An amount less than 30% by weight is unpreferable because durability of the thermosensitive layer is reduced. An amount larger than 99% by weight is also unpreferable since both sensitivity and durability are reduced. In the case of the precursor that satisfies condition (iii), the total content of the alkali-soluble polymer compound is preferably 1 to 90% by weight, more preferably 2 to 70% by weight, and even more preferably 2 to 50% by weight of the total solid content of the thermosensitive layer. A content less than 1% by weight is unpreferable because there is a tendency for durability to be reduced. A content greater than 90% by weight is also unpreferable since there is a tendency for sensitivity and image formability to drop.

Other Components

In addition to the essential components mentioned above, other additives may be added as needed to the upper and lower thermosensitive layers as long as the effects of the invention are not compromised. The additives may be added to only the lower thermosensitive layer, to only the upper thermosensitive layer, or to both of the layers. Examples of the additives are mentioned below.

For example, thermodegradable substances, such as onium salts, o-quinonediazide compounds, aromatic sulfone compounds and aromatic sulfonate compounds, which, when not degraded, substantially lower the solubility of alkali-soluble polymer compounds, are preferably added to the thermal recording layer, since they improve resistance of the image area to dissolution in developer and increase surface hardness. Examples of such onium salts include diazonium salts, ammonium salts, phosphonium salts, iodonium salts, sulfonium salts, selenonium salts, and arsonium salts.

Preferable examples of the onium salts usable in the invention include the diazonium salts described in S. I. Schlesinger, *Photogr. Sci. Eng.*, 18, 387 (1974), T. S. Bal et al., *Polymer*, 21, 423 (1980) and JP-A No. 5-158230; the ammonium salts in U.S. Pat. Nos. 4,069,055 and 4,069,056, JP-A No. 3-140140; the phosphonium salts in D. C. Necker et al., *Macromolecules*, 17, 2468 (1984), C. S. Wen et al., *The Proc. Conf. Rad. Curing ASIA*, p. 478, Tokyo, October (1988), U.S. Pat. Nos. 4,069,055 and 4,069,056; the iodonium salts in J. V. Crivello et al., *Macromolecules*, 10 (6), 1307 (1977), *Chem. & Eng. News*, November 28, p. 31 (1988), EP No. 104,143, U.S. Pat. Nos. 339,049 and 410, 201, JP-A Nos. 2-150848 and 2-296514; the sulfonium salts in J. V. Crivello et al., *Polymer J.*, 17, 73 (1985), J. V. Crivello et al., *J. Org. Chem.*, 43, 3055 (1978), W. R. Watt et al., *J. Polymer Sci.*, Polymer Chem. Ed., 22, 1789 (1984), J. V. Crivello et al., *Polymer Bull.*, 14, 279 (1985), J. V. Crivello et al., *Macromolecules*, 14 (5), 1141 (1981), J. V. Crivello et al., *J. Polymer Sci.*, Polymer Chem. Ed., 17, 2877 (1979), EP Nos. 370,693, 233, 567, 297,443 and 297,442, U.S. Pat. Nos. 4,933,377, 3,902,114, 410, 201, 339,049, 4,760,013, 4,734,444 and 2,833,827, German Patent Nos. 2,904,626, 3,604,580 and 3,604,581; the selenonium salts in J. V. Crivello et al., *Macromolecules*, 10 (6), 1307 (1977), J. V. Crivello et al., *J. Polymer Sci.*, Polymer Chem. Ed., 17, 1047 (1979); and the arsonium salts in C. S. Wen et al., *The Proc. Conf. Rad. Curing ASIA*, p. 478, Tokyo, October (1988).

Of these onium salts, diazonium salts are preferable. Ammonium salts are also preferable in view of improving surface hardness. The diazonium salts described in JP-A No. 5-158230, and the ammonium salts in Japanese Patent Application No. 2001-029890 are particularly preferable.

Examples of counter ions of the onium salts include tetrafluoroborate, hexafluorophosphate, triisopropylnaphthalenesulfonate, 5-nitro-o-toluenesulfonate, 5-sulfosalicylate, 2,5-dimethylbenzenesulfonate, 2,4,6-trimethylbenzenesulfonate, 2-nitrobenzenesulfonate, 3-chlorobenzenesulfonate, 3-bromobenzenesulfonate, 2-fluorocaprylnaphthalenesulfonate, dodecylbenzenesulfonate, 1-naphthol-5-sulfonate, 2-methoxy-4-hydroxy-5-benzoyl-benzenesulfonate and paratoluenesulfonate. Of these, especially preferable are hexafluorophosphate, and alkylaromatic sulfonates such as triisopropylnaphthalenesulfonate and 2,5-dimethylbenzenesulfonate.

When an onium dissolution inhibitor, and preferably an ammonium dissolution inhibitor, is used in the precursor that satisfies condition (ii), the amount thereof added to the upper thermosensitive layer is preferably 1 to 15% by weight, and more preferably 3 to 10% by weight, of the upper thermosensitive layer, in view of increasing surface hardness to 0.50 GPa or more. Applying this to a single-layered thermosensitive layer is not realistic because sensitivity of the layer is significantly lowered. However, when applied to a combination of an upper thermosensitive layer and an alkali-soluble resin-containing lower thermosensitive layer as in the present invention, it is possible to add a predetermined dissolution inhibitor to the upper thermosensitive layer without lowering sensitivity. However, when the amount of the dissolution inhibitor added is greater than 15% by weight, there is the potential for sensitivity to be lowered even if the recording layer comprises multiple layers.

The quinonediazides preferably used in the invention are o-quinonediazide compounds. O-quinonediazide compounds usable in the invention have at least one o-quinonediazido group in one molecule, and, when thermally degraded, promote the solubility of alkali-soluble polymers in alkali. Various types of o-quinonediazide compounds are known, and any are usable herein. O-quinonediazides have two effects. One is that, when they are thermally degraded, they lose their ability to retard binder dissolution. The other is that, when they are thermally degraded, they themselves change into alkali-soluble substances. Based on these effects, o-quinonediazides assist the dissolution of photographic materials. O-quinonediazide compounds usable in the invention are described in, for example, J. Kosar, *Light-Sensitive Systems* (published by John Wiley & Sons, Inc.), pp. 339-352. Especially preferable for use herein are sulfonates or sulfonamides of o-quinonediazides reacted with various types of aromatic polyhydroxy compounds or aromatic amino compounds. Also preferable are the esters of benzoquinone-(1,2)-diazidosulfonyl chloride or naphthoquinone-(1,2)-diazido-5-sulfonyl chloride with pyrogallol-acetone resins described in JP-B No. 43-28403; and the esters of benzoquinone-(1,2)-diazidosulfonyl chloride or naphthoquinone-(1,2)-diazido-5-sulfonyl chloride with phenol-formaldehyde resins described in U.S. Pat. Nos. 3,046, 120 and 3,188,210.

Also preferable are esters of naphthoquinone-(1,2)-diazido-4-sulfonyl chloride with phenol-formaldehyde resins or cresol-formaldehyde resins; and esters of naphthoquinone-(1,2)-diazido-4-sulfonyl chloride with pyrogallol-acetone resins. Examples of other various o-quinonediazide compounds include those disclosed in patent publications such as JP-A Nos. 47-5303, 48-63802, 48-63803, 48-96575, 49-38701 and 48-13354, JP-B Nos. 41-11222, 45-9610 and 49-17481, U.S. Pat. Nos. 2,797,213, 3,454,400, 3,544,323, 3,573,917, 3,674,495 and 3,785,825, British Patent Nos. 1,227,602, 1,251,345, 1,267,005, 1,329,888 and 1,330,932, and German Patent No. 854,890.

Preferably, the amount of the o-quinonediazide compound added is 1 to 50% by weight, more preferably 5 to 30% by weight, and even more preferably 10 to 30% by weight of the total solid content forming the layer. These compounds may be used singly or in combination of two or more.

The amount of the additives other than the o-quinonediazide compounds is preferably 1 to 50% by weight, more preferably 5 to 30% by weight, and even more preferably 10 to 30% by weight. The additives and the alkali-soluble polymer are preferably added to the same layer.

In order to enhance image discrimination and resistance to surface scratching, it is preferable to add a polymer of a (meth)acrylate monomer having in a molecule two or three perfluoroalkyl groups having 3-20 carbon atoms, such as that described in JP-A No. 2000-187318. The compound may be added to either the upper or the lower thermosensitive layer, but is preferably added to the upper thermosensitive layer. The amount of the compound added is preferably 0.1 to 10% by weight, and more preferably 0.5 to 5% by weight, of the thermosensitive layer material.

In order to enhance resistance to scratches, a compound that lowers the static friction coefficient of the surface may be added to the printing plate material. Examples of the compound include esters of long-chain alkylcarboxylates such as those disclosed in U.S. Pat. No. 6,117,913. The compound may be added to either the lower or the upper thermosensitive layer, but is preferably added to the upper thermosensitive layer.

The amount of the compound added is preferably 0.1 to 10% by weight, and more preferably 0.5 to 5% by weight, of the thermosensitive layer material.

If desired, the lower or upper thermosensitive layer may contain a low-molecular compound having an acid group. The acid group may be any of sulfonic acids, carboxylic acids and phosphoric acids. Especially preferable are compounds containing a sulfonic acid group. Specific examples include aromatic sulfonic acids such as p-toluenesulfonic acid and naphthalenesulfonic acid, and aliphatic sulfonic acids.

The compound may be added to either the lower or the upper thermosensitive layer. The amount of the compound added is preferably 0.05 to 5% by weight, and more preferably from 0.1 to 3% by weight of the material forming the layer. An amount greater than 5% is unpreferable since the solubility of each layer in developer increases.

Various dissolution inhibitors may be also added to the lower or upper thermosensitive layer to control solubility of the layer to which they are added. Examples thereof include disulfone compounds or sulfone compounds such as those disclosed in JP-A No. 11-119418. In particular, 4,4'-bishydroxyphenylsulfone is preferable.

The compound may be added to either the lower or the upper thermosensitive layer. The amount of the compound added is preferably 0.05 to 20% by weight, and more preferably 0.5 to 10% by weight of the material forming the layer to which the compound is added.

In order to further increase sensitivity, cyclic acid anhydrides, phenols and organic acids may be added to the precursor. Examples of such cyclic acid anhydrides include the phthalic anhydride, tetrahydrophthalic anhydride, hexahydrophthalic anhydride, 3,6-endoxy-Δ4-tetrahydrophthalic anhydride, tetrachlorophthalic anhydride, maleic anhydride, chloromaleic anhydride, α-phenylmaleic anhydride, succinic anhydride, and pyromellitic anhydride disclosed in U.S. Pat. No. 4,115,128. Examples of the phenols include bisphenol A, p-nitrophenol, p-ethoxyphenol, 2,4,4'-trihydroxybenzophenone, 2,3,4-trihydroxybenzophenone, 4-hydroxybenzophenone, 4,4',4"-trihydroxyphenylmethane and 4,4',3",4"-tetrahydroxy-3,5,3',5'-tetramethyltriphenylmethane. Examples of the organic acids include the sulfonic acids, sulfinic acids, alkylsulfates, phosphonic acids, phosphates, and carboxylic acids disclosed in JP-A Nos. 60-88942 and 2-96755. Specific examples include p-toluenesulfonic acid, dodecylbenzenesulfonic acid, p-toluenesulfinic acid, ethylsulfate, phenylphosphonic acid, phenylphosphinic acid, phenyl phosphate, diphenyl phosphate, benzoic acid, isophthalic acid, adipic acid, p-toluic acid, 3,4-dimethoxybenzoic acid, phthalic acid, terephthalic acid, 4-cyclohexene-1,2-dicarboxylic acid, erucic acid, lauric acid, n-undecanoic acid, and ascorbic acid. The amount of the cyclic acid anhydrides, phenols and organic acids added is preferably 0.05 to 20% by weight, more preferably 0.1 to 15% by weight, and even more preferably 0.1 to 10% by weight, of the material forming the layer to which they are added.

In order to broaden stability of processing with respect to development conditions, the coating solutions for the lower and upper thermosensitive layers may contain the nonionic surfactants disclosed in JP-A Nos. 62-251740 and 3-208514, the ampholytic surfactants disclosed in JP-A Nos. 59-121044 and 4-13149, the siloxane compounds disclosed in EP No. 950517, and the copolymers of fluorine-containing monomers disclosed in JP-A No. 11-288093.

Examples of the nonionic surfactants include sorbitan tristearate, sorbitan monopalmitate, sorbitan trioleate, stearomonoglyceride, and polyoxyethylene nonylphenyl ether. Examples of the ampholytic surfactants include alkyldi(aminoethyl)glycines, alkylpolyaminoethylglycine hydrochlorides, 2-alkyl-N-carboxyethyl-N-hydroxyethylimidazolium betaines, and N-tetradecyl-N,N-betaines (e.g., trade name: Amogen K, manufactured by Daiichi Kogyo).

The siloxane compounds are preferably block copolymers of dimethylsiloxane and polyalkylene oxides, for example, polyalkylene oxide-modified silicones such as DBE-224, DBE-621, DBE-712, DBP-732, DBP-534 (all trade names, manufactured by Chisso) and Tego Glide 100 (trade name, manufactured by Tego).

The content of the nonionic surfactant and the ampholytic surfactant in the coating solution material for the thermosensitive layer is preferably 0.05 to 15% by weight, and more preferably 0.1 to 5% by weight of the solid content of the coating solution.

The upper and lower thermosensitive layers in the invention may contain a printing agent to quickly obtain a visible image after heating through exposure, and may also contain dyes and pigments serving as image colorants.

One typical example of such a printing agent is a combination of a compound that releases an acid by being heated through exposure (optical acid-releasing agent) and a salt-forming organic dye. Specific examples include the combination of an o-naphthoquinonediazido-4-sulfonyl halide and a salt-forming organic dye disclosed in JP-A Nos. 50-36209 and 53-8128, and the combination of a trihalomethyl compound and a salt-forming organic dye disclosed in JP-A Nos. 53-36223, 54-74728, 60-3626, 61-143748, 61-151644 and 63-58440. Examples of the trihalomethyl compound include oxazole compounds and triazine compounds, all of which have good storage stability and contribute to clear printed images.

Apart from the salt-forming organic dyes mentioned above, other dyes are also usable for the image colorant. Examples thereof include oil-soluble dyes and basic dyes, including the salt-forming organic dyes. Specific examples include Oil Yellow #101, Oil Yellow #103, Oil Pink #312, Oil Green BG, Oil Blue BOS, Oil Blue #603, Oil Black BY, Oil Black BS, Oil Black T-505 (all by Orient Chemical Industry), Victoria Pure Blue, Crystal Violet (CI 42555), Methyl Violet (CI 42535), Ethyl Violet, Rhodamine B (CI 145170B), Malachite Green (CI 42000) and Methylene Blue (CI 52015). The dyes described in JP-A No. 62-293247 are especially preferable. The amount of the dye added is 0.01 to 10% by weight, and preferably 0.1 to 3% by weight of the total solid content of the printing plate material.

A plasticizer may also be added as needed to the printing plate material, in order to impart flexibility to the coating film. Examples thereof include butylphthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, and oligomers and polymers of acrylic acid or methacrylic acid.

The upper and lower thermosensitive layers of the precursor of the invention may generally be formed by dissolving the above-mentioned components in a solvent and applying the resulting solution onto a suitable support.

Examples of the solvent include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulforane, γ-butyrolactone and toluene. However, the invention is not limited to these solvents. Additionally, these solvents may be used either singly or in combination.

Preferably, the solvents used for coating are selected so that the solubility of the alkali-soluble polymer in the upper thermosensitive layer differs from that of the alkali-soluble polymer in the lower thermosensitive layer. This is because the lower thermosensitive layer is formed first, and then the upper thermosensitive layer is formed thereon. If the coating solvent for the upper thermosensitive layer dissolves the alkali-soluble polymer in the lower thermosensitive layer that underlies the upper layer, mixing of the layers at the interface thereof becomes remarkable, and, in an extreme case, a single uniform layer is formed. It is preferable for the constituent components to mix at the interface between the adjacent two layers and dissolve to form a single uniform layer, because the effect of the invention characterized by the formation of two thermosensitive layers on a support cannot be obtained. It is thus preferable that the solvent used to form the upper thermosensitive layer is a bad solvent with respect to the alkali-soluble polymer included in the lower thermosensitive layer.

The concentration of the constituent components (total solid content including additives) in the solvent for forming each layer is preferably 1 to 50% by weight.

The coating amount (solid content) of the thermosensitive layer formed on the support after being coated and dried varies depending on the purpose. In the precursor that satisfies condition (i), the coating amount of the upper thermosensitive layer is preferably 0.05 to 0.40 g/m$^2$, and more preferably 0.05 to 1.0 g/m$^2$, and the coating amount of the lower thermosensitive layer is preferably 0.3 to 3.0 g/m$^2$. When the coating amount of the upper thermosensitive layer is less than 0.05 g/m$^2$, there is a tendency for sensitivity to drop. When the coating amount of the upper thermosensitive layer is greater than 1.0 g/m$^2$, the content of the IR absorbing dye that is a hydrophobic component in the thermosensitive layer increases, penetration of developer during development is suppressed, and there is the potential for image formability to drop. When the coating amount of the lower thermosensitive layer falls outside the above-specified range, there is a tendency for image formability to drop. The overall coating amount of the two thermosensitive layers is preferably 0.5 to 3.0 g/m$^2$. When the overall coating amount is less than 0.5 g/m$^2$, coating characteristics drop. When the overall coating amount is greater than 3.0 g/m$^2$, there is a tendency for sensitivity to drop. The less the coating amount becomes, the more apparent sensitivity increases, but coating characteristics of the photosensitive film become worse.

In the precursor that satisfies condition (iii), the coating amount of the upper thermosensitive layer is preferably 0.05 to 0.45 g/m$^2$, and the coating amount of the lower thermosensitive layer is preferably 0.5 to 5.0 g/m$^2$. When the coating amount of the upper thermosensitive layer is less than 0.05 g/m$^2$, the heat generated by the layer though imagewise exposure diffuses to the lower thermosensitive layer and is absorbed by the lower layer, whereby sensitivity drops. Moreover, there is a tendency for film strength in the image forming region (non-exposed area) to be insufficient. When the coating amount of the upper thermosensitive layer is greater than 0.45 g/m$^2$, sensitivity drops because the entire recording layer must be heated to form an image. Moreover, the image area becomes susceptible to scratches formed in the surface of the layer, and there is the potential for chemical resistance during printing to drop. These are unpreferable.

The solutions for forming the layers can be coated by, for example, bar coating, spin coating, spraying, curtain coating, dipping, air knife coating, blade coating or roll coating.

A surfactant, for example, the fluorine-containing surfactant disclosed in JP-A No. 62-170950, may be added to the coating solutions in order to improve coatability thereof. The amount of the surfactant in the upper or lower thermosensitive layer is preferably 0.01 to 1% by weight, and more preferably 0.05 to 0.5% by weight of the total solid content of the layer to which the surfactant is added.

Support

The support in the precursor of the invention may be a tabular support of good dimensional stability that satisfies the necessary requirements of strength and durability. Examples thereof include paper, paper laminated with plastic (e.g., polyethylene, polypropylene, polystyrene), metal sheets (e.g., aluminum, zinc, copper), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal), metal-laminated or deposited paper or plastic films as above.

Preferable examples include polyester films and aluminum sheets, and in particular aluminum sheets because they have good dimensional stability and are relatively inexpensive. Preferably, the aluminum sheets for use in the invention are pure aluminum sheets or aluminum alloy sheets containing minor hetero elements. Aluminum-laminated or deposited plastic films are also usable. The hetero elements that may be in the aluminum alloy include silicon, iron, manganese, copper, magnesium, chromium, zinc, bismuth, nickel, and titanium. The hetero element content of the alloy is at most 10% by weight. In the invention, pure aluminum is preferable for the support. However, because it is difficult to produce 100% pure aluminum in view of smelting technology, aluminum containing minor hetero elements is usable for the support.

There are no particular limitations on the composition of the aluminum sheet used for the support in the invention, and aluminum sheets of conventionally known and used materials are usable herein. The thickness of the aluminum sheet is approximately 0.1 mm to 0.6 mm, preferably 0.15 mm to 0.4 mm, and more preferably 0.2 mm to 0.3 mm.

Preferably, the aluminum sheet is surface-roughened. Before being surface-roughened, the aluminum sheet is optionally degreased with, for example, a surfactant, an organic solvent or an aqueous alkali solution to remove rolling oil from its surface. The surface of the aluminum sheet may be roughened by various methods. For example, it may be mechanically roughened, or may be roughened through electrochemical dissolution or through selective chemical dissolution. Examples of mechanical roughening include ball grinding, brushing, blasting or buffing.

Examples of electrochemical roughening include treating the aluminum sheet in an electrolytic solution of hydrochloric acid or nitric acid with an alternating current or a direct current. Mechanical roughening and electrochemical roughening may be combined as disclosed in JP-A No. 54-63902. After being surface-roughened, the aluminum sheet is then optionally etched with alkali and neutralized, and then further optionally subjected to anodic oxidation to increase water retention and to enhance abrasion resistance of the roughened surface. The electrolyte used for anodic oxidation may be one capable of forming a porous oxide film on the aluminum sheet. Generally, sulfuric acid, phosphoric acid, oxalic acid, chromic acid or a mixture of these acids is used. The electrolyte concentration is determined depending on the type of electrolyte used.

Conditions for anodic oxidation cannot be unconditionally specified because they will vary depending on the electrolyte used. In general, however, the electrolyte concentration is 1 to 80% by weight, liquid temperature is 5 and 70° C.; current density is 5 to 60 A/dm$^2$, voltage is 1 to 100 V, and duration is 10 seconds to 5 minutes. When the amount of the oxide film formed through anodic oxidation is less than 1.0 g/m$^2$, printing durability is insufficient, the non-image area of the printing plate becomes susceptible to scratches, and it becomes easy for ink to adhere to the scratches during printing to cause stains. After being subjected to anodic oxidation, the aluminum sheet is further optionally hydrophilicated. Examples of hydrophilication include the methods using alkali metal silicates (e.g., aqueous sodium silicate solution) disclosed in U.S. Pat. Nos. 2,714,066, 3,181,461, 3,280,734 and 3,902,734. In these methods, an aluminum support is dipped in an aqueous sodium silicate solution or electrolyzed therein. Other examples include processing the aluminum sheet with potassium fluorozirconate, as disclosed in JP-B No. 36-22063, or with polyvinylphosphonic acid, as disclosed in U.S. Pat. Nos. 3,276,868, 4,153,461, and 4,689,272.

The precursor of the invention may optionally include an undercoat layer formed between the support and the lower thermosensitive layer.

Various organic compounds may be used for the undercoat layer, including, for example: carboxymethyl cellulose, dextrin, arabic gum; organic phosphonic acids such as amino group-having phosphonic acids (e.g., 2-aminoethylphosphonic acid), and other optionally-substituted phenylphosphonic acids, naphthylphosphonic acids, alkylphosphonic acids, glycerophosphonic acids, methylenediphosphonic acids and ethylenediphosphonic acids; organic phosphoric acids such as optionally-substituted phenylphosphoric acids, naphthylphosphoric acids, alkylphosphoric acids and glycerophosphoric acids; organic phosphinic acids such as optionally-substituted phenylphosphinic acids, naphthylphosphinic acids, alkylphosphinic acids and glycerophosphinic acids; amino acids such as glycine and β-alanine; and hydroxyl group-having amine hydrochlorides such as triethanolamine hydrochloride. Two or more of these may be combined for the layer.

The organic undercoat layer may be formed by, for example, dissolving the organic compound mentioned above in water or in an organic solvent such as methanol, ethanol or methyl ethyl ketone, or in a mixed solvent of these, and then applying the solution onto an aluminum sheet and allowing the solution to dry. Alternatively, the organic undercoat layer can be formed by dissolving the organic compound mentioned above in water or in an organic solvent such as methanol, ethanol or methyl ethyl ketone, or in a mixed solvent of these, dipping an aluminum sheet in the solution, whereby the sheet adsorbs the organic compound, and then rinsing the sheet with water or the like and allowing the sheet to dry. In the former method, a solution containing 0.005 to 10% by weight of the organic compound may be applied onto an aluminum sheet in any manner. In the latter method, the organic compound concentration of the dipping solution is 0.01 to 20% by weight, preferably 0.05 to 5% by weight, the temperature is 20 to 90° C., and preferably 25 to 50° C., and the dipping time is 0.1 seconds to 20 minutes, and preferably between 2 seconds and 1 minute. The pH value of the solution may be controlled by adding thereto a basic substance such as ammonia, triethylamine or potassium hydroxide, or an acid substance such as hydrochloric acid or phosphoric acid, and is 1 to 12. In order to improve tone reproducibility of the image recording material, a yellow dye may be added.

The coating amount of the organic undercoat layer is 2 to 200 mg/m$^2$, and preferably 5 to 100 mg/m$^2$. When the amount is less than 2 mg/m$^2$ or greater than 200 mg/m$^2$, sufficient printing durability cannot be obtained.

The precursor fabricated in this manner is imagewise exposed and then developed.

The source of active light for image exposure preferably emits near-IR to IR light. Solid state lasers and semiconductor lasers are particularly preferable.

Alkali Development

As the developer and replenisher used to develop the precursor of the invention, it is preferable to use a conventionally known alkali developer that includes a base and an organic compound serving as a buffer, and that substantially does not contain silicon dioxide. This developer is hereinafter referred to in the invention as a "non-silicate developer". The word "substantially" is meant to indicate that the developer may contain minor silicon dioxide present therein as an inevitable impurity or side product.

By using the non-silicate developer to develop the precursor of the invention, the effect is preventing scratches is improved and it is possible to obtain a good planographic printing plate having no defects in the image area thereof. Preferably, the aqueous alkali solution has a pH of 12.5 to 13.5.

The non-silicate developer used in the plate-making process of the invention consists essentially of a base and an organic compound serving as a buffer. Examples of the organic compound include saccharides (especially those of general formulae (I) and (II)), oximes (especially those of general formula (III)), phenols (especially those of general formula (IV)) and fluoroalcohols (especially those of general formula (V)), which are described in JP-A No. 8-220775. The saccharides of formulae (I) and (II) and phenols of formula (V) are preferable. Non-reducing sugars, such as saccharose of the saccharides of formulae (I) and (II), and sulfosalicylic acid, are particularly preferable. Examples of the non-reducing sugars include: trehalose-type oligosaccharides, in which the reducing groups bond to each other; glycosides, in which the reducing group of the saccharide bonds to a non-sugar; and glycoalcohols prepared by reducing saccharides through hydrogenation. Any of these can be used in the invention.

Examples of the trehalose-type oligosaccharides include saccharose and trehalose. Examples of the glycosides include alkyl-glycosides, phenol-glycosides, and mustard oil-glycosides.

Examples of the glycoalcohols include D,L-arabitol, ribitol, xylitol, D,L-sorbitol, D,L-annitol, D,L-iditol, D,L-talitol, dulcitol, and allodulcitol.

Also preferably used are maltitols obtained through hydrogenation of bioses, and reduced saccharides (e.g., reduced starch syrup) obtained through hydrogenation of oligosaccharides.

Of the above-mentioned non-reducing sugars, glycoalcohols and saccharose are preferable, and D-sorbitol, saccharose and reduced starch syrup are more preferable because they act as buffers in a suitable pH region.

These non-reducing sugars may be used singly or in combination. The amount of the non-reducing sugar in the developer is preferably 0.1 to 30% by weight, and more preferably 1 to 20% by weight.

The organic compound serving as the buffer can be combined with a conventionally known alkali as a base.

Examples of the alkali include: inorganic alkalis such as sodium hydroxide, potassium hydroxide, lithium hydroxide, trisodium phosphate, tripotassium phosphate, triammonium phosphate, disodium phosphate, dipotassium phosphate, diammonium phosphate, sodium carbonate, potassium carbonate, ammonium carbonate, sodium hydrogencarbonate, potassium hydrogencarbonate, ammonium hydrogencarbonate, sodium borate, potassium borate and ammonium borate; and potassium citrate, tripotassium citrate, sodium citrate.

Other examples include organic alkalis such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine and pyridine.

These alkalis may be used either singly or combination.

Sodium hydroxide and potassium hydroxide are preferable because they it is possible to control pH in a broad pH range by controlling the amount added to the non-reducing sugars.

Also preferable are trisodium phosphate, tripotassium phosphate, sodium carbonate and potassium carbonate, since they serve as buffers by themselves.

Further, when an automatic developing machine is used for development, it is known that a large number of planographic printing plates can be processed without changing developing solutions in the developing tank over a long period of time by adding to the developing solution an aqueous solution (replenisher, or replenishing solution) whose alkaline strength is greater than that of the developing solution. This replenishing system is also preferably used in the invention. Various surfactants and organic solvents may be added as needed to promote and control development, to disperse development waste and to increase ink affinity of the image area of the printing plate. Examples of preferable surfactants include anionic, cationic, nonionic and ampholytic surfactants. A reducing agent, such as a potassium salt or a sodium salt of an inorganic acid such as hydroquinone, resorcinol, sulfurous acid or hydrogensulfite, as well as an organic carboxylic acid, a defoaming agent and a water softener may be also added to the developer and replenisher.

The printing plate developed with the developer and the replenisher is post-processed with water, a rinsing solution containing a surfactant, and a lipo-desensitizer containing arabic gum and a starch derivative. Various combinations of post-processing can be used in the producing the planographic printing plate of the invention.

In recent years, automatic developing machines for plate materials in printing have come to be used widely, particularly in the plate-making and printing industries, because of the rationalization and standardization of plate-making labor. The automatic developing machine generally comprises a development section and a post-processing section, and has a device that conveys plate material for printing, various processing fluid tanks and a spray device. A printing plate once exposed is sprayed with various processing fluids that have been drawn up by pumps and sprayed out from spray nozzles while the plate is conveyed horizontally, whereby developing processing is carried out. Recently, a method has come to be known in which printing materials are dipped and conveyed by guide rolls in processing fluid tanks filled with processing fluids. In this type of automated processing, processing can be carried out by replenishing the various processing fluids with replenishing fluids in accordance with processing amount and operation time. Moreover, a so-called disposable processing system can also be used, in which processing is effected with substantially unused processing solutions.

If there are unnecessary image portions (e.g., film edge marks of the original image film) on the planographic printing plate obtained by image exposure, development, washing and/or rinsing and/or degumming, the unnecessary image portions are removed. The method disclosed in JP-B No. 2-13293, in which an erasing solution is coated on the unnecessary image portions of the plate, the plate is left for a predetermined period of time and then rinsed with water, is preferable. Also employable is the method disclosed in JP-A No. 59-174842, in which the unnecessary image portion is irradiated with active light led through an optical fiber and then developed.

The planographic printing plate obtained in this manner is, if desired, coated with a lipo-desensitizing gum and supplied to a printing process. If higher printing durability is desired, the printing plate may be burned. In this case, the planographic printing plate is preferably processed with a leveling agent, such as those described in JP-B Nos. 61-2518 and 55-28061 and JP-A Nos. 62-31859 and 61-159655, before being burned. Specifically, a leveling agent may be applied to the printing plate using an automatic coater or with a sponge or absorbent cotton, or the printing plate may be dipped in a vat filled with a leveling agent. After being coated with the leveling agent, the printing plate is preferably squeezed between rollers or with a squeegee to thereby make the coating amount uniform and achieve better results.

The coating amount of the leveling agent is generally 0.03 to 0.8 $g/m^2$ (dry weight). The planographic printing plate coated with the leveling agent is dried as needed, and then heated at a high temperature in a burning processor (e.g., Fuji Photo Film's commercial burning processor, BP-1300, trade name) Heating temperature and time vary depending on the type of components forming the image. However, the heating temperature is preferably 180 to 300° C., and the heating time is preferably 1 to 20 minutes.

The burned planographic printing plate can then be subjected to processing conventionally conducted, such as washing and degumming. However, when the printing plate is coated with a leveling agent that contains a water-soluble polymer compound, lipo-desensitization, such as degumming, may be omitted. The planographic printing plate obtained by such processing is set in an offset printer and used to print a large number of prints.

EXAMPLES

The present invention is described concretely with reference to the following Examples, which, however, are not intended to restrict the scope of the invention.

Example (i)-1

Preparation of Support:

An aluminum alloy containing 0.06% by weight of Si, 0.30% by weight of Fe, 0.014% by weight of Cu, 0.001% by weight of Mn, 0.001% by weight of Mg, 0.001% by weight of Zn, and 0.03% by weight of Ti, with its balance being Al and inevitable impurities, was melted, filtered, and cast into an ingot having a thickness of 500 mm and a width of 1200 mm in a DC casting method. Using a surface cutter, its surface was cut off to an average depth of 10 mm. Then, this was soaked at 550° C. for about 5 hours, and after its temperature lowered to 400° C., this was hot-rolled into a sheet having a thickness of 2.7 mm. Then, this was immediately annealed at 500° C. using a continuous annealing device, and then cold-rolled into a sheet having a thickness of 0.24 mm. The aluminum sheet was cut to have a width of 1030 mm, and then processed according to a continuous surface-treating process mentioned below.

(a) Mechanical Surface-Roughening:

Using rotary nylon brush rollers, the surface of the aluminum sheet was mechanically roughed while an abrasive slurry prepared by suspending an abrasive (silica sand) having a specific gravity of 1.12 in water was applied thereto. The abrasive had a mean particle size of 8 μm and a maximum particle size of 50 μm. The nylon brushes were made of 6, 10-nylon, the length of each nylon hair was 50 mm, and the diameter thereof was 0.3 mm. The nylon hairs were densely planted in many holes formed in a stainless cylinder of 300 mmφ to construct the nylon brushes. Three such rotary nylon brush rollers were used. Two support rollers (200 mmφ) were disposed below the brush rollers, spaced from them by 300 mm. The brush rollers were pressed against the aluminum sheet to such a degree that the load of the power motor to drive the brush rollers increased by 7 kW over the load thereof to the brush rollers not kept in contact with the aluminum sheet. The direction of the brush rotation was the same as the traveling direction of the aluminum sheet. The number of brush revolutions was 200 rpm.

(b) Etching with Alkali:

Thus mechanically roughened, the aluminum sheet was etched by spraying it with an alkali etchant having a sodium hydroxide concentration of 2.6% by weight and an aluminum ion concentration of 6.5% by weight, at 70° C. The aluminum sheet was etched to a degree of 6 g/m$^2$. Then, this was washed with a spray of water.

(c) Desmutting:

Thus etched, the aluminum sheet was desmutted by spraying it with an aqueous 1 wt. % nitric acid solution (containing 0.5% by weight of aluminum ions) at 30° C., and then washed with a spray of water. The aqueous nitric acid solution used for the desmutting treatment is a waste in a process of AC electrochemical surface roughening in an aqueous nitric acid solution.

(d) Electrochemical Surface-Roughening:

Subsequently, the aluminum sheet was electrochemically surface-roughened at an alternating current voltage of 60 Hz. The electrolytic solution used is an aqueous nitric acid solution of 10 g/liter (containing 5 g/liter of aluminum ions and 0.007% by weight of ammonium ions), and its temperature was 80° C.

The current density was 30 A/dm$^2$ as the peak current; and the quantity of electricity was 130 C/dm$^2$ in terms of the total quantity of electricity to the aluminum sheet serving as an anode. 5% of the current from the power source was divided to an auxiliary electrode.

Next, this was washed with a spray of water.

(e) Alkali Etching:

Subsequently, the aluminum sheet was further etched by spraying it with an alkali etchant having a sodium hydroxide concentration of 26% by weight and an aluminum ion concentration of 6.5% by weight, at 32° C. The aluminum sheet was etched to a degree of 0.20 g/m$^2$. This is to remove the smut component of essentially aluminum hydroxide formed in the previous AC electrochemical surface-roughening treatment, and to dissolve and smooth the edges of the pits also formed in the previous treatment. Next, the aluminum sheet was washed with a spray of water.

(f) Desmutting:

The aluminum sheet was again desmutted by spraying it with an aqueous 25 wt. % sulfuric acid solution (containing 0.5% by weight of aluminum ions) at 60° C. Next, this was washed with a spray of water.

(g) Anodic Oxidation:

Subsequently, the aluminum sheet was subjected to anodic oxidation, using a two-stage electrolytic anodic oxidation device. In the device, the length of the first and second electrolysis units is 6 m each; the length of the first and second power supply units is 3 m each; and the length of the first and second power supply electrodes is 2.4 m each. The electrolyte supplied to the first and second electrolysis units is sulfuric acid. The electrolyte had a sulfuric acid concentration of 170 g/liter, and contained 0.5% by weight of aluminum ions. Its temperature was 43° C. Thus processed, the aluminum sheet was washed with a spray of water. The amount of the final oxide film formed was 2.7 g/m$^2$.

(h) Alkali Metal Silicate Treatment:

The aluminum sheet thus having the oxide film formed on its surface through the anodic oxidation treatment was dipped in an aqueous solution of 1% by weight of #3 sodium silicate at 30° C. for 10 seconds, whereby the sheet was processed with the alkali metal silicate (silicate treatment) and its surface was hydrophilicated. Next, this was washed with a spray of water. The silicate having adhered to the surface of the aluminum sheet was 3.5 mg/m$^2$. Thus processed, the aluminum sheet is used as a support in this Example.

Formation of Interlayer (Undercoat Layer):

After processed with the alkali metal silicate in the above, the aluminum support was coated with an undercoating liquid mentioned below, and dried at 80° C. for 15 seconds to form a coating layer thereon. After dried, the coating amount of the layer was 15 mg/m$^2$.

The composition of the undercoating liquid is as follows:

| | |
|---|---|
| Polymer compound mentioned below | 0.3 g |
| Methanol | 100 g |
| Water | 1 g |

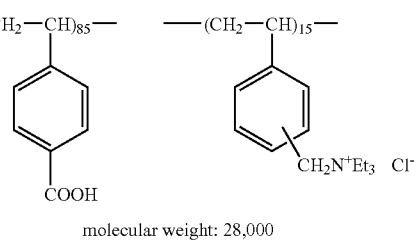

molecular weight: 28,000

Formation of Thermosensitive Layers:

Thus undercoated, the support was coated with a coating liquid for lower thermosensitive layer to a dry weight of 0.85 g/m², and dried in a drier (TABAI's PERFECT OVEN PH200, trade name). The wind control in the drier was 7; the temperature was 140° C.; and the time was 50 seconds. Next, this was further coated with a coating liquid for upper thermosensitive layer to a dry weight of 0.15 g/m² and dried at 120° C. for 1 minute. Thus fabricated, this is a planographic printing plate precursor (i)-1.

The ratio of the IR absorbing dye concentration in the upper thermosensitive layer to that in the lower thermosensitive layer was 3.67.

The composition of the coating liquid for lower thermosensitive layer is as follows:

| | |
|---|---|
| N-(4-aminosulfonylphenyl)methacrylamide/acrylonitrile/-methyl methacrylate copolymer (36/34/30, weight-average molecular weight 50000) | 2.133 g |
| Cyanine dye A (having the structure mentioned below) | 0.109 g |
| 4,4'-Bishydroxyphenylsulfone | 0.063 g |
| Tetrahydrophthalic anhydride | 0.190 g |
| P-toluenesulfonic acid | 0.008 g |
| 2-Methoxy-4-(N-phenylamino)benzenediazonium hexafluorophosphate | 0.03 g |
| Ethyl Violet, in which the counter ion was changed to 6-hydroxynaphthalenesulfonate | 0.05 g |
| Fluorine-containing surfactant (trade name, Megafac F176 by Dai-Nippon Ink and Chemicals, 20% solution in MIBK) | 0.035 g |
| Methyl ethyl ketone | 26.6 g |
| 1-Methoxy-2-propanol | 13.6 g |
| γ-butyrolactone | 13.8 g |

Cyanine Dye A

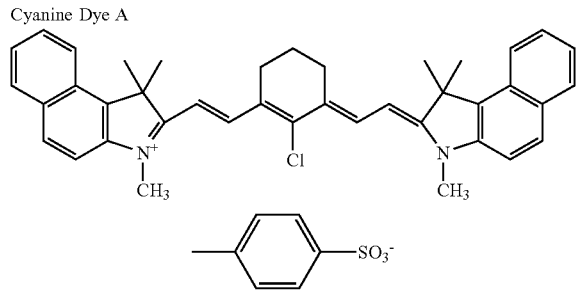

The composition of the coating liquid for upper thermosensitive layer is as follows:

| | |
|---|---|
| m,p-cresol-novolak (m/p ratio = 6/4; weight-average molecular weight 4500; non-reacted cresol content 0.8% by weight) | 0.237 g |
| Cyanine dye A (as above) | 0.047 g |
| Fluorine-containing surfactant (trade name, Megafac F176 by Dai-Nippon Ink and Chemicals, 20% solution in MIBK) | 0.110 g |
| Methyl ethyl ketone | 15.1 g |
| 1-Methoxy-2-propanol | 7.7 g |

Examples (i)-2, -3, Comparative Examples (i)-1, -2

Planographic printing plate precursors (i)-2 to -5 were fabricated in the same manner as in Example (i)-1, except that the amount of the IR absorbing dye in the upper and lower thermosensitive layers was varied to those indicated in Table 1 below.

TABLE 1

| | | Amount of IR absorbing dye (g) | | |
|---|---|---|---|---|
| | | upper layer | lower layer | a/b* |
| Example (i)-2 | precursor (i)-2 | 0.109 | 0.037 | 2.58 |
| Example (i)-3 | precursor (i)-3 | 0.046 | 0.08 | 7.00 |
| Comp. Ex. (i)-1 | precursor (i)-4 | 0.015 | 0.109 | 40.8 |
| Comp. Ex. (i)-2 | precursor (i)-5 | 0 | 0.156 | — | a: IR absorbing dye concentration in upper thermosensitive layer
b: IR absorbing dye concentration in lower thermosensitive layer Comparative Example (i)-3

A planographic printing plate precursor (i)-6 was fabricated in the same manner as in Example (i)-1, except that an IR absorbent pigment, carbon black, but not the IR absorbent cyanine dye A was added to the coating liquid for upper and lower thermosensitive layers.

Evaluation of Precursor Sensitivity:

The sensitivity of the planographic printing plate precursors (i)-1 to -6 fabricated in the above was measured as follows:

Using Creo's Trendsetter (trade name), a solid image was written on each of the planographic printing plate precursors (i)-1 to -6. The beam strength was from 2 to 7 W; and the drum revolution was 150 rpm. Using a PS processor (900 H, trade name by Fuji Photo Film) with a developer (DT-1, trade name by Fuji Photo Film, diluted to 1/8) and a finisher (FP2W, trade name by Fuji Photo Film, diluted to 1/1) put therein, these were developed at 30° C. for 12 seconds. The electroconductivity of the developer was 45 mS/cm.

The developed plates were observed under a 50-power magnifying glass. From the strength of the exposure beam to the area of each sample with no pepper seen therein, the actual exposure energy applied to each sample was calculated, and this indicates the sensitivity of the sample inspected. Samples having required a smaller degree of exposure energy have a higher sensitivity.

The results are given in Table 2 below.

Evaluation of Ablation Resistance:

The planographic printing plate precursors (i)-1 to -6 were tested for ablation resistance according to the method mentioned below.

A 100 μm-thick PET film was stuck to the surface of the thermal recording layer of each of the planographic printing plate precursors (i)-1 to -6. Using Creo's Trendsetter (trade name), a solid image was written on each sample. The exposure energy was 200 mJ/cm², and the drum revolution was 150 rpm. The PET film was peeled away from each sample, and the degree of the thermal recording layer having scattered to the PET film through ablation was visually checked according to the criteria mentioned below.
A: No deposit found.
B: Some but a little deposit found.
C: Much deposit found.

The results are given in Table 2.

TABLE 2

| | Precursor | Sensitivity (mJ/cm²) | Ablation Resistance |
|---|---|---|---|
| Example (i)-1 | precursor (i)-1 | 70 | A |
| Example (i)-2 | precursor (i)-2 | 65 | A |
| Example (i)-3 | precursor (i)-3 | 60 | A |
| Comp. Ex. (i)-1 | precursor (i)-4 | 120 | A |
| Comp. Ex. (i)-2 | precursor (i)-5 | 125 | B |
| Comp. Ex. (i)-3 | precursor (i)-6 | 65 | C |

It is understood that the planographic printing plate precursors of Examples (i)-1 to -3 of the invention all have high sensitivity and can undergo recording and that they all had no deposit resulting from layer ablation in exposure.

As opposed to these, the sensitivity of the precursor of Comparative Example (i)-1, in which the ratio of the IR absorbing dye concentration in the upper thermosensitive layer to that in the lower thermosensitive layer is 40.8, is low; and the sensitivity of the precursor of Comparative Example (i)-2 not containing an IR absorbing dye in the lower thermosensitive layer is also low, and the ablation resistance thereof is not good. The sensitivity of the precursor of Comparative Example (i)-3, which contains an IR absorbent pigment, carbon black, as a light-heat converting agent in place of an IR absorbing dye, is high and can undergo recoring, but its ablation resistance is extremely bad and is not on a practicable level.

Example (ii)-1

The same support as in Example (i)-1 was coated with a coating liquid for lower thermosensitive layer mentioned below to a dry weight of 0.85 g/m², and then dried in a drier (TABAI's PERFECT OVEN PH200, trade name). The wind control in the drier was 7; the temperature was 140° C.; and the time was 50 seconds. Next, this was further coated with a coating liquid for the thermosensitive layer to a dry weight of 0.15 g/m², and dried at 120° C. for 1 minute. Thus fabricated, this is a planographic printing plate precursor (ii)-1.

The composition of the coating liquid for lower thermosensitive layer is as follows:

| | |
|---|---|
| N-(4-aminosulfonylphenyl)methacrylamide/acrylonitrile/-methyl methacrylate copolymer (36/34/30, weight-average molecular weight 50000, acid value 2.65) | 2.133 g |
| Cyanine dye B (having the structure mentioned below) | 0.109 g |
| 4,4'-Bishydroxyphenylsulfone | 0.126 g |
| Tetrahydrophthalic anhydride | 0.190 g |
| P-toluenesulfonic acid | 0.008 g |
| 3-Methoxy-4-diazodiphenylamine hexafluorophosphate | 0.030 g |
| Ethyl Violet, in which the counter ion was changed to 6-hydroxynaphthalenesulfonate | 0.10 g |
| Fluorine-containing surfactant for improving coated surface condition (trade name, Megafac F176 by Dai-Nippon Ink and Chemicals) | 0.035 g |
| Methyl ethyl ketone | 25.38 g |
| 1-Methoxy-2-propanol | 13.0 g |
| γ-butyrolactone | 13.2 g |

Cyanine Dye B

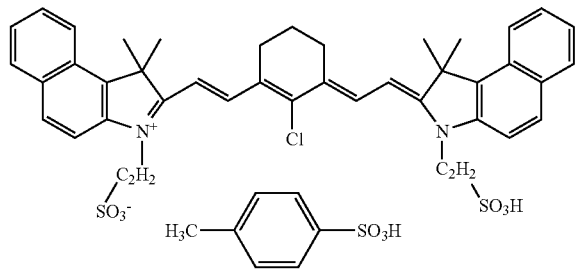

The composition of the coating liquid for upper thermosensitive layer is as follows:

| | |
|---|---|
| m,p-cresol-novolak (m/p ratio = 6/4; weight-average molecular weight 4500; non-reacted cresol content 0.8% by weight) | 0.2846 g |
| Cyanine dye A (as above) | 0.075 g |
| Behenamide | 0.060 g |
| Fluorine-containing surfactant for improving coated surface condition (trade name, Megafac F176 (20%) by Dai-Nippon Ink and Chemicals) | 0.022 g |
| Fluorine-containing surfactant for improving image formation (trade name, Megafac MCF-312 (30%) by Dai-Nippon Ink and Chemicals | 0.120 g |
| Methyl ethyl ketone | 15.1 g |
| 1-Methoxy-2-propanol | 7.7 g |

Example (ii)-2

A planographic printing plate precursor (ii)-2 was fabricated in the same manner as in Example (ii)-1, except that a coating liquid mentioned below was used for the lower thermosensitive layer.

The composition of the coating liquid for lower thermosensitive layer is as follows:

| | |
|---|---|
| 2,3-Xylenol/p-aminosulfonylphenol/formaldehyde copolycondensate resin (weight-average molecular weight, 3000) | 2.333 g |
| Cyanine dye C (having the structure mentioned below) | 0.109 g |
| 4,4'-Bishydroxyphenylsulfone | 0.126 g |
| Tetrahydrophthalic anhydride | 0.190 g |
| P-toluenesulfonic acid | 0.008 g |
| 3-Methoxy-4-diazodiphenylamine hexafluorophosphate | 0.030 g |
| Ethyl Violet, in which the counter ion was changed to 6-hydroxynaphthalenesulfonate | 0.10 g |
| Methyl ethyl ketone | 25.38 g |

| | |
|---|---|
| 1-Methoxy-2-propanol | 13.0 g |
| γ-butyrolactone | 13.2 g |

Cyanine Dye C

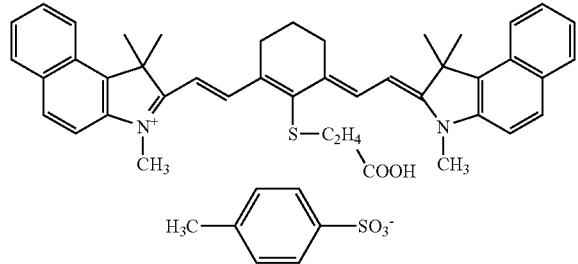

Example (ii)-3

A planographic printing plate precursor (ii)-3 was fabricated in the same manner as in Example (ii)-1, except that a coating liquid mentioned below was used for the upper thermosensitive layer.

The composition of the coating liquid for upper thermosensitive layer is as follows:

| | |
|---|---|
| m,p-cresol-novolak (m/p ratio = 6/4; weight-average molecular weight 4500; non-reacted cresol content 0.8% by weight) | 0.2846 g |
| Cyanine dye A (as above) | 0.075 g |
| Surfactant for improving coated surface condition (trade name, Megafac F176 (20%) by Dai-Nippon Ink and Chemicals) | 0.022 g |
| Methyl ethyl ketone | 15.1 g |
| 1-Methoxy-2-propanol | 7.7 g |

Example (ii)-4

A planographic printing plate precursor (ii)-4 was fabricated in the same manner as in Example (ii)-1, except that coating liquids mentioned below were used for the upper and lower thermosensitive layers.

The composition of the coating liquid for upper thermosensitive layer is as follows:

| | |
|---|---|
| m,p-cresol-novolak (m/p ratio = 6/4; weight-average molecular weight 4500; non-reacted cresol content 0.8% by weight) | 0.2846 g |
| Cyanine dye B (as above) | 0.075 g |
| Polyethylene oxide (mean molecular weight, 1000) | 0.06 g |
| Surfactant for improving coated surface condition (trade name, Megafac F176 (20%) by Dai-Nippon Ink and Chemicals) | 0.022 g |
| Methyl ethyl ketone | 15.1 g |
| 1-Methoxy-2-propanol | 7.7 g |

The composition of the coating liquid for lower thermosensitive layer is as follows:

| | |
|---|---|
| N-(4-aminosulfonylphenyl)methacrylamide/acrylonitrile/-methyl methacrylate copolymer (36/34/30, weight-average molecular weight 50000, acid value 2.65) | 2.133 g |
| Cyanine dye D (having the structure mentioned below) | 0.109 g |
| 4,4'-Bishydroxyphenylsulfone | 0.126 g |
| Tetrahydrophthalic anhydride | 0.190 g |
| P-toluenesulfonic acid | 0.008 g |
| 3-Methoxy-4-diazodiphenylamine hexafluorophosphate | 0.030 g |
| Ethyl Violet, in which the counter ion was changed to 6-hydroxynaphthalenesulfonate | 0.10 g |
| Fluorine-containing surfactant for improving coated surface condition (trade name, Megafac F176 by Dai-Nippon Ink and Chemicals) | 0.035 g |
| Fluorine-containing surfactant for improving image formation (trade name, Megafac MCF-312 (30%), trade name by Dai-Nippon Ink and Chemicals) | 0.120 g |
| Methyl ethyl ketone | 25.38 g |
| 1-Methoxy-2-propanol | 13.0 g |
| γ-butyrolactone | 13.2 g |

Cyanine Dye D

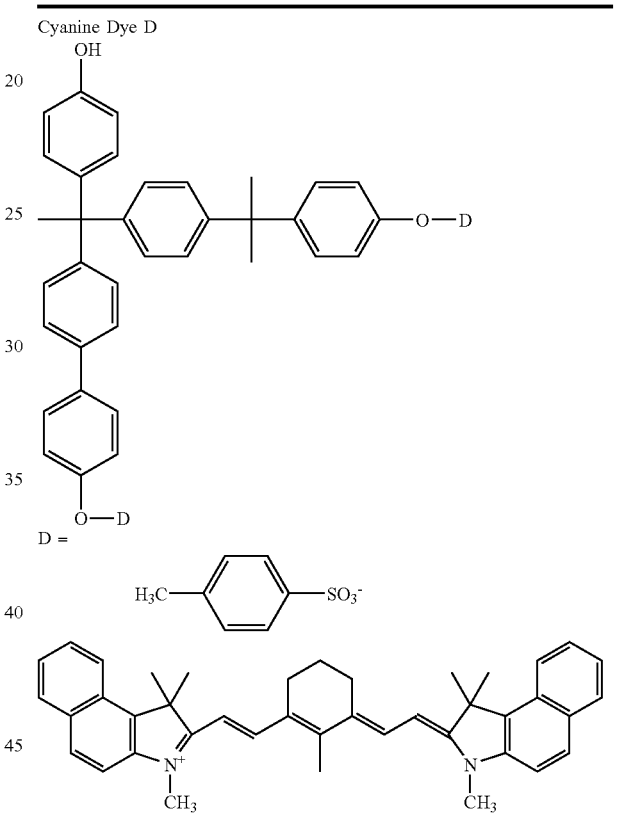

Example (ii)-5

A planographic printing plate precursor (ii)-5 was fabricated in the same manner as in Example (ii)-1, except that the coating amount of the upper thermosensitive layer was 0.20 g/m².

Example (ii)-6

A planographic printing plate precursor (ii)-6 was fabricated in the same manner as in Example (ii)-1, except the following points: In preparing the support, the step (h) of alkali metal silicate treatment was omitted. An undercoating liquid mentioned below was applied to the support, and dried at 80° C. for 30 seconds to form an undercoat layer thereon. The coating amount of the undercoat layer is 10 mg/m².

The composition of the undercoating liquid is as follows:

| β-alanine | 0.1 g |
|---|---|
| Phenylsulfonic acid | 0.05 g |
| Methanol | 40 g |
| Water | 60 g |

Example (ii)-7

Preparation of Support:

An aluminum alloy containing 0.06% by weight of Si, 0.30% by weight of Fe, 0.014% by weight of Cu, 0.001% by weight of Mn, 0.001% by weight of Mg, 0.001% by weight of Zn, and 0.03% by weight of Ti, with its balance being Al and inevitable impurities, was melted, filtered, and cast into an ingot having a thickness of 500 mm and a width of 1200 mm in a DC casting method. Using a surface cutter, its surface was cut off to an average depth of 10 mm. Then, this was soaked at 550° C. for about 5 hours, and after its temperature lowered to 400° C., this was hot-rolled into a sheet having a thickness of 2.7 mm. Then, this was immediately annealed at 500° C., and then cold-rolled into a sheet having a thickness of 0.30 mm. The aluminum sheet was cut to have a width of 1030 mm, and then processed according to a continuous surface-treating process mentioned below.

(b) Etching with Alkali:

After mechanically roughened, the aluminum sheet was etched by spraying it with an alkali etchant having a sodium hydroxide concentration of 2.6% by weight and an aluminum ion concentration of 6.5% by weight, at 70° C. The aluminum sheet was etched to a degree of 6 g/m². Then, this was washed with a spray of water.

(c) Desmutting:

Thus etched, the aluminum sheet was desmutted by spraying it with an aqueous 1 wt. % nitric acid solution (containing 0.5% by weight of aluminum ions) at 30° C., and then washed with a spray of water. The aqueous nitric acid solution used for the desmutting treatment is a waste in a process of AC electrochemical surface roughening in an aqueous nitric acid solution.

(d) Electrochemical Surface-Roughening:

Subsequently, the aluminum sheet was electrochemically surface-roughened at an alternating current voltage of 60 Hz. The electrolytic solution used is an aqueous hydrochloric acid solution of 4 g/liter (containing 5 g/liter of aluminum ions), and its temperature was 35° C. The AC current density was 1200 A/m².

Next, this was washed with a spray of water.

(e) Alkali Etching:

Subsequently, the aluminum sheet was further etched by spraying it with an alkali etchant having a sodium hydroxide concentration of 26% by weight and an aluminum ion concentration of 6.5% by weight, at 32° C. The aluminum sheet was etched to a degree of 0.20 g/m². This is to remove the smut component of essentially aluminum hydroxide formed in the previous AC electrochemical surface-roughening treatment, and to dissolve and smooth the edges of the pits also formed in the previous treatment. Next, the aluminum sheet was washed with a spray of water.

(f) Desmutting:

The aluminum sheet was again desmutted by spraying it with an aqueous 25 wt. % sulfuric acid solution (containing 0.5% by weight of aluminum ions) at 60° C. Next, this was washed with a spray of water.

(g) Anodic Oxidation:

Subsequently, the aluminum sheet was subjected to anodic oxidation, using a two-stage electrolytic anodic oxidation device. In the device, the length of the first and second electrolysis units is 6 m each; the length of the first and second power supply units is 3 m each; and the length of the first and second power supply electrodes is 2.4 m each. The electrolyte supplied to the first and second electrolysis units is sulfuric acid. The electrolyte had a sulfuric acid concentration of 170 g/liter, and contained 0.5% by weight of aluminum ions. Its temperature was 43° C. Thus processed, the aluminum sheet was washed with a spray of water. The amount of the final oxide film formed was 2.7 g/m².

(h) Alkali Metal Silicate Treatment:

The aluminum sheet thus having the oxide film formed on its surface through the anodic oxidation treatment was dipped in an aqueous solution of 1% by weight of #3 sodium silicate at 30° C. for 10 seconds, whereby the sheet was processed with the alkali metal silicate (silicate treatment). Next, this was washed with a spray of water. Thus processed, the aluminum sheet is used as a support in this Example.

Formation of Undercoat Layer:

After processed with the alkali metal silicate in the above, the aluminum support was coated with an undercoating liquid mentioned below, and dried at 80° C. for 15 seconds to form a coating layer thereon. After dried, the coating amount of the layer was 15 mg/m².

The composition of the undercoating liquid is as follows:

| Compound mentioned below | 0.3 g |
|---|---|
| Methanol | 100 g |
| Water | 1 g |

—(CH$_2$—CH)$_{85}$—     —(CH$_2$—CH)$_{15}$—

(with phenyl-COOH and phenyl-CH$_2$N$^+$Et$_3$ Cl$^-$ substituents)

molecular weight: 28,000

A planographic printing plate precursor (ii)-7 was fabricated in the same manner as in Example (ii)-1 except that the support prepared as above was used for it.

Comparative Example (ii)-1

A planographic printing plate precursor (ii)-8 was fabricated in the same manner as in Example (ii)-1 except that a coating liquid mentioned below was used for the lower thermosensitive layer.

The composition of the coating liquid for lower thermosensitive layer is as follows:

| | |
|---|---:|
| N-(4-aminosulfonylphenyl)methacrylamide/acrylonitrile/-methyl methacrylate copolymer (36/34/30, weight-average molecular weight 50000, acid value 2.65) | 2.133 g |
| Cyanine dye B (as above) | 0.109 g |
| 4,4'-Bishydroxyphenylsulfone | 0.126 g |
| Tetrahydrophthalic anhydride | 0.190 g |
| P-toluenesulfonic acid | 0.008 g |
| 3-Methoxy-4-diazodiphenylamine hexafluorophosphate | 0.030 g |
| Ethyl Violet, in which the counter ion was changed to 6-hydroxynaphthalenesulfonate | 0.10 g |
| Fluorine-containing surfactant for improving coated surface condition (trade name, Megafac F176 by Dai-Nippon Ink and Chemicals) | 0.035 g |
| Methyl ethyl ketone | 25.38 g |
| 1-Methoxy-2-propanol | 13.0 g |
| γ-butyrolactone | 13.2 g |

Evaluation of Planographic Printing Plate Precursors:

Evaluation of Latitude in Development:

Using Creo's Trendsetter (trade name), a test pattern image was written on each of the planographic printing plate precursors (ii)-1 to -8. The beam strength was 9 W; and the drum revolution was 150 rpm.

Thus imagewise exposed under the condition as above, the precursors (ii)-1 to -8 were developed at 30° C. for 12 seconds, using a PS processor (900 H, trade name by Fuji Photo Film) with a developer (DT-1, trade name by Fuji Photo Film, diluted to different degrees) put therein. The absence of stains and discoloration in the prints from the printing plates was confirmed, and the electroconductivity of the developer with which the precursors were well processed into the good printing plates was determined. The stains and discoloration in the prints, if any, result from the development failure in processing the precursors, and they are caused by and some part of the recording layer having still remained on the processed plates. The results are given in Table 3. The samples for which the difference between the uppermost limit and the lowermost limit of the electroconductivity of the developer used is large are good in point of the latitude in development.

Scratch Resistance Test:

Using a scratch tester by HEIDON, the planographic printing plate precursors (ii)-1 to -8 were tested for scratch resistance. Concretely, each precursor was scratched with a diamond needle (having a tip diameter of 1.0 mm) under a load, and then developed with a developer (DT-1, trade name by Fuji Photo Film—diluted to have an electroconductivity of 45 mS/cm) The load under which the sample tested was scratched was measured, and this indicates the scratch resistance of the sample. The samples having accepted a larger load in the test have higher scratch resistance.

The developer (DT-1) used herein consists essentially of sorbitol, and it is a non-silicate developer.

The results of the scratch resistance test are given in Table 3.

TABLE 3

| | Precursor | Development Latitude (uppermost–lowermost) (mS/cm) | Scratch Resistance (g) |
|---|---|---|---|
| Example (ii)-1 | (ii)-1 | 41–57 | 8 |
| Example (ii)-2 | (ii)-2 | 41–57 | 7 |
| Example (ii)-3 | (ii)-3 | 41–56 | 9 |
| Example (ii)-4 | (ii)-4 | 41–56 | 8 |
| Example (ii)-5 | (ii)-5 | 41–57 | 8 |
| Example (ii)-6 | (ii)-6 | 41–57 | 8 |
| Example (ii)-7 | (ii)-7 | 41–59 | 9 |
| Comp. Ex. (ii)-1 | (ii)-8 | 45–51 | 3 |

As in Table 3, it is obvious that the planographic printing plate precursors (ii)-1 to -7 of the Examples of the invention all have broader latitude in development and better scratch resistance than the comparative planographic printing plate precursor (ii)-8 in which both the upper and lower thermosensitive layers contain the same IR absorbing dye.

As described hereinabove, the planographic printing plate precursor of the invention to be processed into a printing plate has a two-layered thermal recording layer composed of upper and lower thermosensitive layers, in which the upper and lower thermosensitive layers contain different IR absorbents, and the precursor well applies to an IR laser recording system. Its sensitivity in image formation is high, and its latitude in development is broad, and, in addition, its scratch resistance is good. This means that the printing plate from the precursor gives good prints free from defects to be caused by the scratches in the image area of the printing plate.

Example (iii)-1

Preparation of Support:

An aluminum sheet of at least 99.5% aluminum, containing 0.30% Fe, 0.10% Si, 0.02% Ti and 0.013% Cu and having a thickness of 0.3 mm was degreased by washing it with trichloroethylene. Using a nylon brush, its surface was sand-grained with an aqueous suspension of 400-mesh pumice, and then well washed with water. This sheet was etched by dipping it in an aqueous 25 wt. % sodium hydroxide solution at 45° C. for 9 seconds, then washed with water, and further washed by dipping it in 20 wt. % nitric acid for 20 seconds. Through the process, the sand-grained surface of the plate was etched to a degree of about 3 g/m². Next, this sheet was subjected to DC anodic oxidation in an electrolytic solution of 7 wt. % sulfuric acid at a current density of 15 A/dm² to form thereon an oxide film having a thickness of 3 g/m², then washed with water and dried. This was further processed with an aqueous 2.5 wt. % sodium silicate solution at 30° C. for 10 seconds, and then undercoated in the same manner as in Example (i)-1. Thus undercoated, this was dried at 80° C. for 15 seconds. The dry weight of the undercoat layer formed was 15 mg/m². Thus processed, the aluminum plate serves as a support in this Example.

Thus undercoated, the support was coated with a coating liquid for lower recording layer to a dry weight of 0.75 g/m², and dried in a drier (TABAI's PERFECT OVEN PH200, trade name) The wind control in the drier was 7; the temperature was 140° C.; and the time was 50 seconds. Next, this was further coated with a coating liquid for upper recording layer to a dry weight of 0.3 g/m², and dried at 120° C. for 1 minute. Thus fabricated, this is a photosensitive planographic printing plate precursor of this Example.

The composition of the coating liquid for lower recording layer is as follows:

| | |
|---|---|
| N-(4-aminosulfonylphenyl)methacrylamide/acrylonitrile/-methyl methacrylate copolymer (36/34/30, weight-average molecular weight 50000) | 1.896 g |
| Cresol-novolak (m/p = 6.4, weight-average molecular weight 4500, residual monomer content 0.8% by weight) | 0.237 g |
| IR absorbing dye (Compound IR-1) | 0.109 g |
| 4,4'-Bishydroxyphenylsulfone | 0.063 g |
| Tetrahydrophthalic anhydride | 0.190 g |
| P-toluenesulfonic acid | 0.008 g |
| Ethyl Violet, in which the counter ion was changed to 6-hydroxynaphthalenesulfonate | 0.05 g |
| Fluorine-containing surfactant (trade name, Megafac F176 by Dai-Nippon Ink and Chemicals) | 0.035 g |
| Methyl ethyl ketone | 26.6 g |
| 1-Methoxy-2-propanol | 13.6 g |
| γ-butyrolactone | 13.8 g |

The composition of the coating liquid for upper recording layer is as follows:

| | |
|---|---|
| m,p-cresol-novolak (m/p ratio = 6/4; weight-average molecular weight 4500; non-reacted cresol content 0.8% by weight) | 0.237 g |
| IR absorbent (Compound IR-1) | 0.047 g |
| Dodecyl stearate | 0.060 g |
| 3-Methoxy-4-diazodiphenylamine hexafluorophosphate | 0.030 g |
| Fluorine-containing surfactant (trade name, Megafac F176 by Dai-Nippon Ink and Chemicals) | 0.110 g |
| Fluorine-containing surfactant (trade name, Megafac MCF312 (30%) by Dai-Nippon Ink and Chemicals) | 0.120 g |
| Methyl ethyl ketone | 15.1 g |
| 1-Methoxy-2-propanol | 7.7 g |

Comparative Examples (iii)-1

A photosensitive planographic printing plate precursor (iii)-1 was fabricated in the same manner as in Example (iii)-1, except that an IR absorbent, IR-792 perchlorate (trade name by Sigma Aldrich Japan) having a structure mentioned below was added to the coating liquids for lower and upper recording layers.

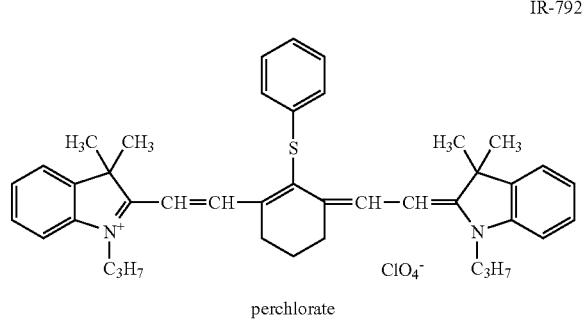

IR-792 perchlorate

Comparative Example (iii)-2

The same support as in Example (iii)-1 was coated with a coating liquid (iii)-2 for recording layer mentioned below to a dry weight of 1.0 g/m², and dried at 140° C. for 50 seconds to fabricate a photosensitive planographic printing plate precursor.

The composition of the coating liquid (iii)-2 for recoding layer is as follows:

| | |
|---|---|
| N-(4-aminosulfonylphenyl)methacrylamide/acrylonitrile/-methyl methacrylate copolymer (35/35/30, weight-average molecular weight 50000) | 1.896 g |
| Cresol-novolak (m/p = 6.4, weight-average molecular weight 4500, residual monomer content 0.8% by weight) | 0.332 g |
| IR absorbing dye (Compound IR-1) | 0.155 g |
| 4,4'-Bishydroxyphenylsulfone | 0.063 g |
| Tetrahydrophthalic anhydride | 0.190 g |
| P-toluenesulfonic acid | 0.008 g |
| Ethyl Violet, in which the counter ion was changed to 6-hydroxynaphthalenesulfonate | 0.05 g |
| Fluorine-containing surfactant (trade name, Megafac F176 by Dai-Nippon Ink and Chemicals) | 0.145 g |
| Fluorine-containing surfactant (trade name, Megafac MCF-312 (30%) by Dai-Nippon Ink and Chemicals) | 0.120 g |
| Methyl ethyl ketone | 26.6 g |
| 1-Methoxy-2-propanol | 13.6 g |
| γ-butyrolactone | 13.8 g |

Examples (iii)-2 to -11

Planographic printing plate precursors were fabricated in the same manner as in Example (iii)-1, except that the IR absorbents in the lower and upper recording layers were varied to those indicated in Table 4 below.

Evaluation of Photosensitive Planographic Printing Plate Precursors:

Evaluation of Latitude in Development:

Using Creo's Trendsetter (trade name), a test pattern image was written on each of the planographic printing plate precursors. The beam strength was 9 W; and the drum revolution was 150 rpm.

Thus imagewise exposed, the precursors were developed at 30° C. for 12 seconds, using a PS processor (900 H, trade name by Fuji Photo Film) with a developer (DT-1, trade name by Fuji Photo Film, diluted to different degrees) put therein. The highest electroconductivity and the lowest electroconductivity of the developers, with which the precursors were well developed to give good printing plates with no development failure, were determined. The development failure causes partial remaining of non-removed recording layers on the printing plates, and the prints from the printing plates have stains and discoloration therein. The difference between the highest electroconductivity and the lowest electroconductivity of the developers thus determined indicates the latitude in development of the printing plate precursors. The results are given in Table 4.

Evaluation of Ablation Resistance:

The planographic printing plate precursors were exposed to a semiconductor laser to visually determine the presence or absence of ablation thereon. The power of the laser was 500 mW; the wavelength thereof was 830 nm; the beam diameter thereof was 17 μm (1/e²); and the main scanning rate thereof was 5 m/sec. The results are given in Table 4.

TABLE 4

| | IR Absorbent in lower recording layer | IR Absorbent in upper recording layer | Development Latitude (mS/cm) | Ablation |
|---|---|---|---|---|
| Example (iii)-1 | IR-1 | IR-1 | 12 | no |
| Comp. Ex. (iii)-1 | IR-792 perchlorate | IR-792 perchlorate | 4 | yes, but a little |

TABLE 4-continued

| | IR Absorbent in lower recording layer | IR Absorbent in upper recording layer | Development Latitude (mS/cm) | Ablation |
|---|---|---|---|---|
| Comp. Ex. (iii)-2 | IR-1 | upper layer not formed | 5 | no |
| Example (iii)-2 | IR-14 | IR-792 perchlorate | 8 | yes, but a little |
| Example (iii)-3 | IR-792 perchlorate | IR-14 | 8 | no |
| Example (iii)-4 | IR-14 | IR-14 | 12 | no |
| Example (iii)-5 | IR-48 | IR-48 | 12 | no |
| Example (iii)-6 | IR-20 | IR-20 | 11 | no |
| Example (iii)-7 | IR-46 | IR-46 | 13 | no |
| Example (iii)-8 | IR-14 | IR-1 | 10 | no |
| Example (iii)-9 | IR-1 | IR-14 | 9 | no |
| Example (iii)-10 | not added | IR-14 | 9 | no |
| Example (iii)-11 | IR-1 | not added | 8 | no |

The results confirm that the photosensitive planographic printing plate precursor of the invention, which has at least two recording layers and in which at least one recording layer contains an IR absorbent having, in one molecule at least two chromophoric groups capable of absorbing IR light and bonding to each other via covalent bonding, has broad latitude in development for image formation and can form a good image thereon through exposure to IR laser, and that the printing plate precursor of the invention enables direct plate-making into a printing plate.

What is claimed is:

1. A positive planographic printing plate precursor comprising a support having successively disposed thereon
   a lower thermosensitive layer containing a water-insoluble but alkali-soluble polymer compound, and
   an upper thermosensitive layer containing a water-insoluble but alkali-soluble polymer compound, with solubility in an aqueous alkali solution increasing under heat,
   wherein both the upper thermosensitive layer and the lower thermosensitive layer contain an IR absorbing dye, wherein the ratio of the IR absorbing dye concentration in the upper thermosensitive layer to the IR absorbing dye concentration in the lower thermosensitive layer is 1.6 to 10.0, and the coating amount of the upper thermosensitive layer is at most 0.4 g/m².

2. The positive planographic printing plate precursor according to claim 1, wherein the upper thermosensitive layer and the lower thermosensitive layer contain different IR absorbing dyes, and in which the amount of the IR absorbing dye added to the upper thermosensitive layer is 3 to 50% by weight of the overall weight of the layer, and the amount of the IR absorbing dye added to the lower thermosensitive layer is 0.1 to 10% by weight of the overall weight of the layer.

3. The photosensitive planographic printing plate precursor according to claim 1, wherein at least one of the upper thermosensitive layer and the lower thermosensitive layer contains an IR absorbent having, in one molecule, at least two chromophoric groups that absorb IR light, with the chromophoric groups in the IR absorbent bonding to each other via a covalent bond, and in which the IR absorbent is represented by the following general formula (I):

wherein A represents a divalent or more polyvalent organic group; n indicates an integer of 2 or more; D represents at least one chromophoric group having an absorption in infrared ray range; two or more chromophoric groups may be the same or different, and when the chromophoric group has a charged partial structure, it may have an ionic group charged oppositely to the charge of the chromophoric group so as to neutralize the charge of the chromophoric group.

4. The positive planographic printing plate precursor according to claim 1, in which the ratio of the IR absorbing dye concentration in the upper thermosensitive layer to the IR absorbing dye concentration in the lower thermosensitive layer is 3.0 to 6.0.

5. The positive planographic printing plate precursor according to claim 1, wherein the amount of the IR absorbing dye added to each thermosensitive layer is 0.01 to 60% by weight of the total solid content of each layer.

6. The positive planographic printing plate precursor according to claim 1, wherein the amount of the water-insoluble but alkali-soluble polymer compound in the thermosensitive layers is 30 to 99% by weight of the total solid content of the layers.

7. The positive planographic printing plate precursor according to claim 2, wherein the surface hardness of the upper thermosensitive layer is at least 0.50 GPa.

8. The positive planographic printing plate precursor according to claim 3, wherein the amount of the IR absorbing dye in each thermosensitive layer is 0.01 to 50% by weight of the total solid content of each layer.

9. The positive planographic printing plate precursor according to claim 3, wherein the amount of the water-insoluble but alkali-soluble polymer compound in the thermosensitive layers is 1 to 90% by weight of the total solid content of the layers.

10. The positive planographic printing plate precursor according to claim 1, wherein the upper thermosensitive layer further contains a substance that substantially lowers the solubility of the alkali-soluble polymer compound.

11. The positive planographic printing plate precursor according to claim 10, wherein the upper thermosensitive layer further contains, as the substance that substantially lowers the solubility of the alkali-soluble polymer compound, at least an onium dissolution inhibitor.

12. The positive planographic printing plate precursor according to claim 1, wherein the water-insoluble but alkali-soluble polymer compound has, in the molecule, a functional group of any of phenolic hydroxyl groups, sulfonamido groups or active imido groups.

13. The positive planographic printing plate precursor according to claim 12, wherein the water-insoluble but alkali-soluble polymer compound is a polymer compound prepared through polymerization of at least two of phenolic hydroxyl group-containing polymerizable monomers, sulfonamido group-containing polymerizable monomers, and active imido group-containing polymerizable monomers, or a polymer compound prepared through copolymerization of at least two such polymerizable monomers with any other polymerizable monomer.

14. The positive planographic printing plate precursor according to claim 13, wherein the water-insoluble but alkali-soluble polymer compound is a copolymer prepared through copolymerization of a phenolic hydroxyl group-containing polymerizable monomer with a sulfonamido group-containing polymerizable monomer and/or an active imido group-containing polymerizable monomer, and the mixing ratio by weight of these components is 50/50 to 5/95.

15. The positive planographic printing plate precursor according to claim 14, wherein the water-insoluble but alkali-soluble polymer compound is a copolymer prepared through copolymerization of a phenolic hydroxyl group-containing polymerizable monomer, a sulfonamido group-containing polymerizable monomer or an active imido group-containing polymerizable monomer with any other polymerizable monomer, and the copolymer contains at least 10 mol % of any of the phenolic hydroxyl group-containing polymerizable monomer, the sulfonamido group-containing polymerizable monomer and the active imido group-containing polymerizable monomer that render the copolymer soluble in alkali.

* * * * *